(12) United States Patent
Qie et al.

(10) Patent No.: US 10,081,745 B1
(45) Date of Patent: Sep. 25, 2018

(54) WATER-BASED PRESSURE-SENSITIVE ADHESIVE COMPOSITIONS

(71) Applicant: 3M INNOVATIVE PROPERTIES COMPANY, St. Paul, MN (US)

(72) Inventors: Lili Qie, Woodbury, MN (US); Zhong Chen, Woodbury, MN (US); Zhipeng Song, Chadds Ford, PA (US); John R. Jacobsen, Woodbury, MN (US); Jayshree Seth, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/538,981

(22) PCT Filed: Dec. 14, 2015

(86) PCT No.: PCT/US2015/065534
§ 371 (c)(1),
(2) Date: Jun. 22, 2017

(87) PCT Pub. No.: WO2016/109174
PCT Pub. Date: Jul. 7, 2016

Related U.S. Application Data

(60) Provisional application No. 62/097,784, filed on Dec. 30, 2014.

(51) Int. Cl.
| | |
|---|---|
| C08F 2/26 | (2006.01) |
| C08F 265/06 | (2006.01) |
| C09J 151/00 | (2006.01) |
| C09J 7/38 | (2018.01) |
| C08F 220/06 | (2006.01) |

(52) U.S. Cl.
CPC ............ C09J 151/003 (2013.01); C08F 2/26 (2013.01); C09J 7/385 (2018.01); C08F 220/06 (2013.01); C08F 265/06 (2013.01); C08F 2500/02 (2013.01); C08F 2800/10 (2013.01)

(58) Field of Classification Search
CPC .......... C09J 151/003; C09J 7/385; C09F 2/26; C09F 220/06; C09F 265/06; C09F 2500/02; C09F 2800/10
USPC ........................................................ 524/458
See application file for complete search history.

(56) References Cited

U.S. PATENT DOCUMENTS

| | | | |
|---|---|---|---|
| 3,241,662 A | 3/1966 | Robinson | |
| 3,324,218 A | 6/1967 | Gebler | |
| 3,578,622 A | 5/1971 | Brown | |
| 4,912,169 A | 3/1990 | Whitmire | |
| 5,032,460 A | 7/1991 | Kantner | |
| 5,204,219 A | 4/1993 | Van Ooij | |
| 5,492,950 A | 2/1996 | Brown | |
| 5,637,646 A | 6/1997 | Ellis | |
| 5,686,517 A | 11/1997 | Wells | |
| 5,686,518 A | 11/1997 | Fontenot | |
| 5,804,610 A | 9/1998 | Hamer | |
| 5,986,011 A | 11/1999 | Ellis | |
| 6,048,611 A * | 4/2000 | Lu | C08F 220/18 428/355 AC |
| 6,451,425 B1 | 9/2002 | Kozulla | |
| 6,511,744 B2 | 1/2003 | Centner | |
| 6,638,637 B2 | 10/2003 | Hager | |
| 6,657,011 B2 | 12/2003 | Lau | |
| 6,710,128 B1 | 3/2004 | Helmer | |
| 6,783,850 B2 | 8/2004 | Takizawa | |
| 7,531,595 B2 | 5/2009 | Lewandowski | |
| 8,258,240 B2 | 9/2012 | Suzuki | |
| 9,845,414 B2 * | 12/2017 | Wieneke | B05D 7/5423 |
| 2002/0082319 A1 | 6/2002 | Zhao | |
| 2003/0125459 A1 | 7/2003 | Wulff | |
| 2010/0081764 A1 | 4/2010 | Ouzineb | |
| 2010/0099317 A1 | 4/2010 | Suzuki | |
| 2011/0008605 A1 | 1/2011 | Suzuki | |
| 2011/0086219 A1 | 4/2011 | Ikeya | |
| 2011/0263787 A1 | 10/2011 | Takahashi | |
| 2012/0082816 A1 | 4/2012 | Wada | |
| 2012/0114930 A1 | 5/2012 | Yamamoto | |
| 2012/0157593 A1 | 6/2012 | Ootake | |
| 2012/0328864 A1 | 12/2012 | Takarada | |
| 2013/0005911 A1 | 1/2013 | Okamoto | |
| 2013/0059105 A1 | 3/2013 | Wright | |

(Continued)

FOREIGN PATENT DOCUMENTS

| | | |
|---|---|---|
| EP | 0301827 | 2/1989 |
| EP | 0372756 | 6/1990 |
| EP | 0554832 | 8/1993 |
| EP | 1911771 | 4/2008 |
| EP | 2803712 | 11/2014 |

(Continued)

OTHER PUBLICATIONS

Zhao, "Structured latex particles with improved mechanical properties", Progress in Organic Coatings, 1999, vol. 35, pp. 265-275.

Primary Examiner — Kelechi C Egwim
(74) Attorney, Agent, or Firm — Jean A. Lown

(57) ABSTRACT

A pressure-sensitive adhesive is provided that is a dried product of a latex composition, which is formed from an emulsion composition. The latex composition and the emulsion composition are also provided. The emulsion composition has droplets that contain various monomers plus a (meth)acrylate polymer dissolved in the monomers. Additionally, an article containing a layer of the pressure-sensitive adhesive and a method of forming the pressure-sensitive adhesive are provided. The pressure-sensitive adhesives often have both high peel adhesion and high shear strength (i.e., high cohesive strength or high shear holding power).

15 Claims, 1 Drawing Sheet

(56) References Cited

U.S. PATENT DOCUMENTS

2016/0333223 A1 11/2016 Qie
2017/0081566 A1 3/2017 Zhang

FOREIGN PATENT DOCUMENTS

| JP | 2003-105298 | 4/2003 |
|----|----|----|
| JP | 2004-263024 | 9/2004 |
| JP | 2006-052358 | 2/2006 |
| WO | WO 1993/08239 | 4/1993 |
| WO | WO 1996/07522 | 3/1996 |
| WO | WO 2008/103526 | 8/2008 |
| WO | WO 2011/139593 | 11/2011 |
| WO | WO 2013/032771 | 3/2013 |
| WO | WO 2013/074446 | 5/2013 |
| WO | WO 2014/186169 | 11/2014 |
| WO | WO 2016/109173 | 7/2016 |
| WO | WO 2016/109176 | 7/2016 |

\* cited by examiner

WATER-BASED PRESSURE-SENSITIVE ADHESIVE COMPOSITIONS

CROSS REFERENCE TO RELATED APPLICATIONS

This application is a national stage filing under 35 U.S.C. 371 of PCT/US2015/065534, filed Dec. 14, 2015, which claims the benefit of U.S. Provisional Application No. 62/097,784, filed Dec. 30, 2014, the disclosure of which is incorporated by reference in its/their entirety herein.

TECHNICAL FIELD

A pressure-sensitive adhesive, a latex composition used to form the pressure-sensitive adhesive, and an emulsion composition used to form the latex composition are provided.

BACKGROUND

Pressure-sensitive adhesive (PSA) tapes are virtually ubiquitous in the home and workplace. In one of its simplest configurations, a pressure-sensitive tape includes a backing layer and an adhesive layer attached to the backing layer. According to the Pressure-Sensitive Tape Council, pressure-sensitive adhesives are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., about 20° C. to 25° C.). Materials that are merely sticky or that adhere to a surface do not necessarily constitute a PSA; the term PSA encompasses materials with additional viscoelastic properties.

Acrylic-based pressure-sensitive adhesives have been widely used. These pressure-sensitive adhesive compositions can be prepared with or without an organic solvent. PSA compositions containing organic solvents, while currently dominant in the marketplace, are decreasing in importance due to various issues such as pollution, high energy consumption, and flammability associated with the use of organic solvents. That is, the adhesive industry is increasingly focused on adhesive compositions that have either low or no organic solvent content.

Some such adhesive compositions can, for example, be prepared from water-based latex compositions formed by emulsion polymerization. Such adhesives are described, for example, in U.S. Pat. No. 5,686,518 (Fontenot et al.), U.S. Pat. No. 6,710,128 (Helmer et al.), U.S. Pat. No. 6,511,744 (Centner et al.), U.S. Pat. No. 6,048,611 (Lu et al.), U.S. Pat. No. 4,912,169 (Whitmire et al.), U.S. Pat. No. 6,657,011 (Lau et al.), U.S. Pat. No. 8,258,240 (Suzuki et al.), and U.S. Patent Application Publication No. 2010/0081764 (Ouzineb et al.).

SUMMARY

A pressure-sensitive adhesive is provided that is the dried product of a latex composition, which is formed from an emulsion composition. The latex composition and the emulsion composition are also provided. Additionally, an article containing the pressure-sensitive adhesive and a method of forming the pressure-sensitive adhesive are provided. The pressure-sensitive adhesive has a good balance of peel adhesion and shear strength (i.e., cohesion) at both room temperature (e.g., about 20° C. to about 25° C.) and elevated temperatures (e.g., around about 70° C.), particularly when adhered to low surface energy substrates.

In a first aspect, an emulsion composition is provided that contains a) water, b) a polymerizable surfactant having an unsaturated group that can undergo free radical polymerization, c) a first monomer composition, and d) a second (meth)acrylate polymer. The first monomer composition includes an alkyl (meth)acrylate having a linear or branched alkyl group with at least six carbon atoms. The second (meth)acrylate polymer is present in an amount of 0.5 to 15 weight percent based on a total weight of monomers in the first monomer composition and has a glass transition temperature greater than or equal to 50° C. The second (meth)acrylate polymer is formed from a second monomer composition containing at least 50 weight percent of a cyclic alkyl (meth)acrylate based on a total weight of monomers in the second monomer composition, wherein the cyclic alkyl group has at least six carbon atoms. The emulsion composition contains a first phase that includes the water and a second phase dispersed as droplets within the first phase. The droplets contain a mixture of i) at least 90 weight percent of the first monomer composition and ii) the second (meth)acrylate polymer. The second (meth)acrylate polymer is not miscible with the first phase and is dissolved in the first monomer composition within the droplets.

In a second aspect, a latex composition is provided that contains a reaction product (i.e., polymerized product) of an emulsion composition, wherein the latex composition contains polymeric latex particles. The emulsion composition is the same as described above.

In a third aspect, a pressure-sensitive adhesive is provided that is a dried product of a latex composition. The latex composition contains a reaction product (i.e., polymerized product) of an emulsion composition, wherein the latex composition contains polymeric latex particles. The emulsion composition is the same as described above.

In a fourth aspect, an article is provided. The article contains a substrate and a first pressure-sensitive adhesive layer positioned adjacent to (and adhered to directly or indirectly) a first major surface of the substrate. The pressure-sensitive adhesive layer is a dried product of a latex composition. The latex composition contains a reaction product (i.e., polymerized product) of an emulsion composition, wherein the latex composition contains polymeric latex particles. The emulsion composition is the same as described above.

In a fifth aspect, a method of forming a pressure-sensitive adhesive is provided. The method includes a) forming an emulsion composition as described above; b) polymerizing the emulsion composition to form a latex composition comprising polymeric latex particles; and c) drying the latex composition to form the pressure-sensitive adhesive.

DETAILED DESCRIPTION

Figure 1:
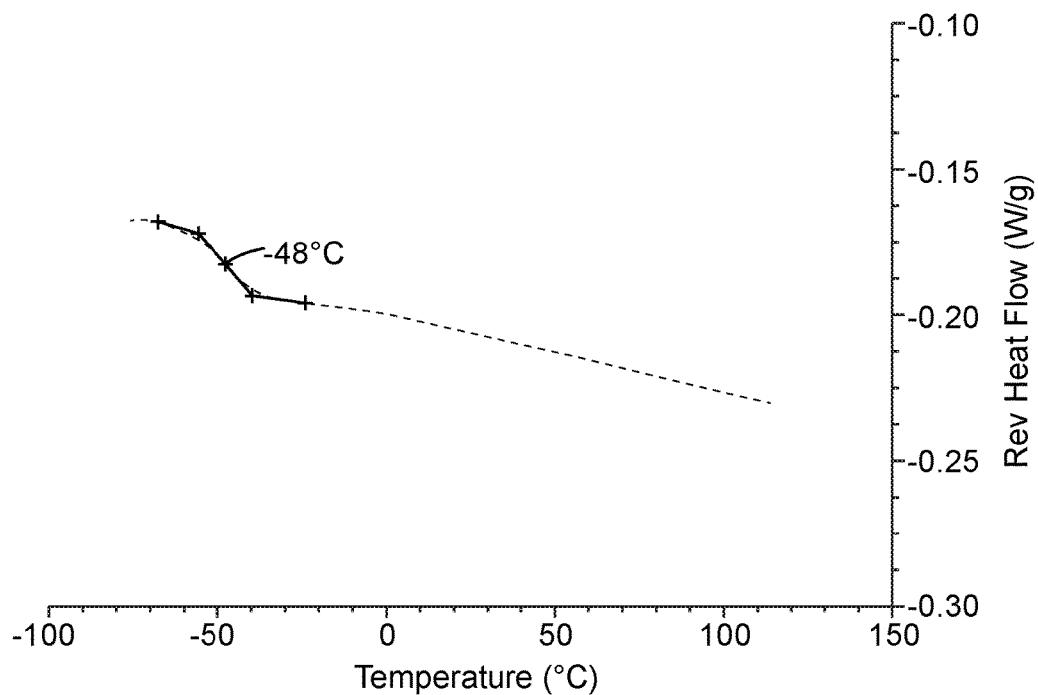
FIG. 1 is the Modulated Differential Scanning Calorimetry plot from the second heating (2H) cycle for the polymeric latex particles of Example 1. Heat flow is plotted as a function of temperature in a nitrogen atmosphere.

A pressure-sensitive adhesive is provided that is a dried product of a latex composition, which is formed from an emulsion composition. The latex composition and the emulsion composition are also provided. The emulsion composition has droplets suspended in a first phase that is mainly water. The droplets contain various monomers plus a (meth) acrylate polymer dissolved in the monomers. The content of the droplets in the emulsion composition are polymerized to form polymeric latex particles in the latex composition. A pressure-sensitive adhesive is provided by drying the latex composition. Additionally, an article containing a layer of the pressure-sensitive adhesive and a method of forming the pressure-sensitive adhesive are provided.

The pressure-sensitive adhesives often have a good balance between peel strength and shear strength (i.e., cohesive strength or shear holding power), particularly when adhered to low surface energy surfaces. It can be a challenge to make pressure-sensitive adhesives with this good balance of adhesive properties. Increasing the peel strength often is accompanied by a decrease in shear strength while increasing the shear strength often is accompanied by a decrease in peel strength. The addition of the second (meth)acrylate polymer into the emulsion composition contributed to the formation of pressure-sensitive adhesives with the improved balance between peel strength and sheer strength. That is, shear strength could be improved while maintaining good peel strength (or without unduly sacrificing peel strength) and peel strength could be improved while maintaining good shear strength (or without unduly sacrificing shear strength).

As used herein, the terms "polymer" and "polymeric" and "polymeric material" are used interchangeably to refer to a homopolymer, copolymer, terpolymer, and the like.

As used herein, the term "(meth)acrylate" refers to both methacrylate and acrylate monomers, polymeric materials derived from these monomers, or both. Likewise, the term "(meth)acrylic" refers to both acrylic and methacrylic materials, the term "(meth)acrylamide" refers to both acrylamide and methacrylamide, and the term "(meth)acrylonitrile" refers to both methacrylonitrile and acrylonitrile.

As used herein, the term "(meth)acrylate polymer" refers to a polymeric material formed from one or more ethylenically unsaturated monomers, wherein greater than 50 weight percent of the monomers have an ethylenically unsaturated group that is a (meth)acryloyl group of formula $H_2C=CR^a-(CO)-$ where $R^a$ is hydrogen or methyl and $-(CO)-$ is a carbonyl group. Some example (meth)acrylate polymers are formed from monomer compositions having greater than 60 weight percent, greater than 70 weight percent, greater than 80 weight percent, greater than 90 weight percent, greater than 95 weight percent, greater than 98 weight percent, or greater than 99 weight percent monomers having a (meth)acryloyl group. The weight percent is based on the total weight of monomers in the monomer composition used to form the (meth)acrylate polymer.

The term "glass transition temperature" or "$T_g$" refers to the temperature at which a material changes from a glassy state to a rubbery state. In this context, the term "glassy" means that the material is hard and brittle (and therefore relatively easy to break) while the term "rubbery" means that the material is elastic and flexible. For polymeric materials, the $T_g$ is the critical temperature that separates their glassy and rubbery behaviors. If a polymeric material is at a temperature below its $T_g$, large-scale molecular motion is severely restricted because the material is essentially frozen. On the other hand, if the polymeric material is at a temperature above its $T_g$, molecular motion on the scale of its repeat unit takes place, allowing it to be soft or rubbery. Any reference herein to the $T_g$ of a monomer refers to the $T_g$ of a homopolymer formed from that monomer. The glass transition temperature of a polymeric material is often determined using methods such as Differential Scanning Calorimetry (e.g., Modulated Differential Scanning Calorimetry). Alternatively, the glass transition of a polymeric material can be calculated using the Fox Equation if the amount and $T_g$ of each monomer used to form the polymeric material are known.

When referring to a range, the endpoints of the range are considered to be in the range. For example, the expressions "in a range from x to y", "in a range of x to y", "in an amount from x to y", "in an amount of x to y", or similar expressions include the endpoints x and y.

As used herein, the term "and/or" such as in the expression A and/or B means A alone, B alone, or both A and B.

The emulsion composition that is used to form the latex composition and, ultimately, the pressure-sensitive adhesive contains a) water, b) a polymerizable surfactant having an unsaturated group that can undergo a free radical polymerization reaction (e.g., an ethylenically unsaturated group), c) a first monomer composition, and d) a second (meth)acrylate polymer. The emulsion has a first phase that includes water and a second phase dispersed as droplets within the first phase. The polymerizable surfactant is typically predominately (e.g., at least 95 weight percent or more, at least 97 weight percent, at least 98 weight percent, at least 99 weight percent, at least 99.5 weight percent, at least 99.8 weight percent, or at least 99.9 weight percent) present in the first phase and/or at the interface between the droplets and the first phase. The second (meth)acrylate polymer is dissolved in the monomers of the first monomer composition within the droplets of the second phase of the emulsion composition. The second (meth)acrylate polymer typically is not miscible with the first phase of the emulsion composition. The second (meth)acrylate polymer is formed from a second monomer composition that is different than the first monomer composition contained in the emulsion composition.

A major component of the emulsion composition is water. The percent solids of the emulsion composition are often up to 70 weight percent or higher such as up to 75 weight percent. If the percent solids are higher, the viscosity of the emulsion may be too high to adequately disperse the droplets. In some embodiments, the percent solids are up to 65 weight percent, up to 60 weight percent, up to 55 weight percent, or up to 50 weight percent. The percent solids are typically at least 10 weight percent. If the solids are lower, the efficiency of preparation of the latex particles may be unacceptably low. In some embodiments, the percent solids are at least 15 weight percent, at least 20 weight percent, at least 25 weight percent, at least 30 weight percent, at least 35 weight percent, at least 40 weight percent, or at least 45 weight percent. In some examples, the percent solids are in a range of 10 to 75 weight percent, 10 to 70 weight percent, 20 to 70 weight percent, 30 to 70 weight percent, 40 to 70 weight percent, or 40 to 60 weight percent. The percent solids are based on the total weight of the emulsion composition.

The portion of the emulsion composition that is not a solid is typically water. Thus, the water content of the emulsion is often at least 25 weight percent or at least 30 weight percent. In some embodiments, the water content can be up to 90 weight percent, up to 85 weight percent, up to 80 weight percent, up to 75 weight percent, up to 70 weight percent, up to 65 weight percent, up to 60 weight percent, or up to 55 weight percent. The water content can be at least 35 weight percent, at least 40 weight percent, at least 45 weight percent, or at least 50 weight percent. In some examples, the water content is in a range of 25 to 90 weight percent, 30 to 90 weight percent, 30 to 80 weight percent, 30 to 70 weight percent, 30 to 60 weight percent, or 40 to 60 weight percent. The amount of water is based on the total weight of the emulsion composition.

Some of the water can be replaced with a polar organic solvent that is miscible with water such as a polar solvent. If present, no more than 20 weight percent, no more than 15 weight percent, no more than 10 weight percent, or no more than 5 weight percent of the first phase is the water-miscible, polar organic solvent. The polar solvent is often an alcohol such as an alcohol having 1 to 10 carbon atoms, 1 to 6 carbon atoms, or 1 to 4 carbon atoms. In many embodiments, no water-miscible, polar organic solvent is purposefully added to the emulsion composition but may be present as a contaminant or diluent in one of the other components.

The emulsion composition contains a polymerizable surfactant. As used herein, the term "polymerizable surfactant" refers to a surfactant with a polymerizable group, which is an unsaturated group that can undergo a free radical polymerization reaction. In the emulsion composition, the polymerizable surfactant is typically in the first phase and/or at the interface between first phase and the droplets that are suspended in the first phase. The polymerizable surfactant facilitates the formation of a latex composition having good stability (e.g., the polymeric latex particles remain suspended and do not coalesce). The polymerizable surfactant may become part of the polymeric latex particles during the polymerization reaction of the emulsion composition.

Using a polymerizable surfactant rather than a surfactant without a polymerizable group tends to improve the peel strength and the shear strength of the resulting pressure-sensitive adhesive. Under high humidity conditions, a surfactant without a polymerizable group tends to migrate to the surface of a pressure-sensitive adhesive. The presence of the surfactant on the surface of the pressure-sensitive adhesive can decrease the adhesive properties of the pressure-sensitive adhesive. In contrast, the polymerizable surfactant can polymerize with the monomers in the first monomer composition and become part of the polymeric latex particles. Polymerization into the polymeric latex particle tends to restrict the mobility of the surfactant.

Example polymerizable surfactants include propenyl polyoxyethylene alkylphenyl compounds such as those commercially available from Montello, Inc. (Tulsa, Okla., USA) under the trade designation NOIGEN RN (e.g., RN-10, RN-20, RN-30, RN-40, and RN-5065), which have a structure shown below where n is at least 2 and where x is an integer such as one close to or equal to 9.

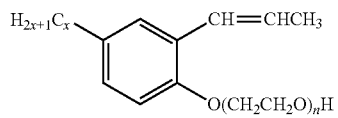

Other example polymerizable surfactants include propenyl polyoxyethylene alkylphenyl ether ammonium sulfate compounds such as those commercially available from Montello, Inc. under the trade designation HITENOL BC (e.g., BC-10, BC-1025, BC-20, BC-2020, and BC-30), which have a structure shown below where n is at least 2 and where x is an integer such as one close to or equal to 9.

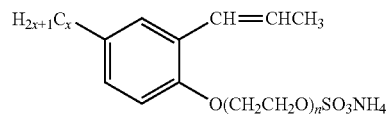

Another example polymerizable surfactant is sodium dodecylallyl sulfosuccinate, $CH_3—(CH_2)_{11}—O—(CO)—CH_2—CH(SO_3Na)—(CO)—O—CH_2—CH=CH_2$, which may be commercially available under the trade designation TREM LF40 from Cognis Corporation (North Rhime-Westphalia, Germany). Yet other example polymerizable surfactants are phosphate esters such as those commercially available from Croda (Edison, N.Y., USA) under the trade designation MAXENUL (e.g., MAXEMUL 6106 and 6112).

The polymerizable surfactant is typically used in an amount up to about 2 weight percent, up to 1.8 weight percent, or up to 1.5 weight percent. The amount of the polymerizable surfactant is usually at least 0.5 weight percent, at least 0.7 weight percent, or at least 1 weight percent. The weight percents are based on the total weight of monomers in the first monomer composition.

The emulsion composition contains a first monomer composition. The first monomer composition is typically selected such that the polymerized product of the first monomer composition, which is referred to as the "first (meth)acrylate polymer", has a glass transition temperature no greater than 20° C., no greater than 10° C., no greater than 0° C., no greater than −10° C., or no greater than −20° C.

The first monomer composition in the emulsion composition typically includes an alkyl (meth)acrylate having a linear or branched alkyl group with at least six carbon atoms. In many embodiments, other optional monomers can be included provided that the polymerized product has a sufficiently low glass transition temperature. The amount and type of any optional monomers are selected so that at least 90 weight percent of the monomers within the first monomer composition are within droplets dispersed in the first phase of the emulsion composition. The alkyl (meth)acrylate monomer having a linear or branched alkyl group with at least six carbon atoms is likely to have a low solubility in the first phase and is likely to be predominately (e.g., at least 95 weight percent or more, at least 97 weight percent, at least 98 weight percent, at least 99 weight percent, at least 99.5 weight percent, at least 99.8 weight percent, or at least 99.9 weight percent) in the droplets, which are dispersed in the first phase. If optional polar monomers or other optional monomers are included in the first monomer composition that are less hydrophobic that the alkyl (meth)acrylate monomer having a linear or branched alkyl group with at least six carbon atoms, the solubility of these optional monomers may be greater in water (e.g., in the first phase) compared to the alkyl (meth)acrylate monomer having a linear or branched alkyl group with at least six carbon atoms. As polymerization occurs within the droplet, some of these optional monomers in the first phase may diffuse into the droplet and become part of polymeric latex particles that are formed.

The alkyl (meth)acrylate in the first monomer composition has a linear or branched alkyl group with at least six carbon atoms. Alkyl (meth)acrylate monomers with an alkyl group having less than six carbon atoms are less hydrophobic and are less likely to reside predominately within the droplets. In some embodiments, the alkyl group can have at least 8 carbon atoms, at least 10 carbon atoms, or at least 12 carbon atoms. The alkyl group of the alkyl (meth)acrylate can have up to 28 carbon atoms or more, up to 24 carbon atoms, up to 20 carbon atoms, or up to 18 carbon atoms. In many embodiments, particularly when the number of carbon atoms is greater than 12, the alkyl group is branched. Some alkyl (meth)acrylates having an alkyl group greater than 12 carbon atoms can crystallize if the alkyl group is linear. Crystallization of the alkyl (meth)acrylate is not desirable in the emulsion composition.

Example alkyl (meth)acrylate monomers having a linear or branched alkyl group with at least six carbon atoms for use in the first monomer composition include, but are not limited to, n-hexyl acrylate, 4-methyl-2-pentyl acrylate, 3-methylpentyl acrylate, 2-ethylbutyl acrylate, 2-ethylhexyl acrylate, 2-methylhexyl acrylate, n-octyl acrylate, isooctyl acrylate, 2-octyl acrylate, isononyl acrylate, isoamyl acrylate, n-decyl acrylate, isodecyl acrylate, 2-propylheptyl acrylate, isotridecyl acrylate, isostearyl acrylate, 2-octyldecyl acrylate, lauryl acrylate, heptadecanyl acrylate, n-hexyl methacrylate, isodecyl methacrylate, 2-ethylhexyl methacrylate, isooctyl methacrylate, and lauryl methacrylate.

Still others alkyl (meth)acrylates having a linear or branched alkyl group with at least six carbon atoms for use in the first monomer composition are of Formula (I).

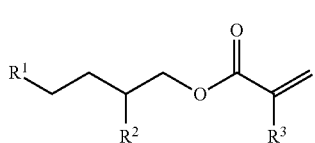

(I)

In Formula (I), group $R^3$ is hydrogen or methyl and groups $R^1$ and $R^2$ are each independently a linear or branched alkyl group having 4 to 14 carbon atoms. These monomers are often formed from a Guerbet alcohol, which is a 2-alkyl alkanol. Example monomers of Formula (I) include 2-butyloctyl acrylate, 2-butyldecyl acrylate, 2-hexyloctyl acrylate, 2-hexyldecyl acrylate, 2-tetradecyloctadecyl acrylate, 2-dodecylhexadecyl acrylate, 2-decyltetradecyl acrylate, 2-octyldodecyl acrylate, 2-hexyldecyl acrylate, 2-octyldecyl acrylate, 2-hexyldodecyl acrylate, and 2-octyldodecyl acrylate.

The first monomer composition typically contains at least 50 weight percent alkyl (meth)acrylate having a linear or branched alkyl group with at least six carbon atoms. The first monomer composition often contains at least 60 weight percent, at least 70 weight percent, or at least 80 weight percent of the alkyl (meth)acrylate having a linear or branched alkyl group with at least six carbon atoms. The amount of the alkyl (meth)acrylate having an alkyl group with at least six carbon atoms can be up to 100 weight percent. The first monomer composition often contains up to 95 weight percent, up to 90 weight percent, or up to 85 weight percent of the alkyl (meth)acrylate having a linear or branched alkyl group with at least six carbon atoms. In some embodiments, the amount of the alkyl (meth)acrylate is in a range of 50 to 100 weight percent, in a range of 50 to 95 weight percent, in a range of 60 to 95 weight percent, in a range of 70 to 95 weight percent, or in a range of 75 to 90 weight percent. The amount of the alkyl (meth)acrylate is based on a total weight of monomers in the first monomer composition.

In many embodiments, the alkyl (meth)acrylate having a linear or branched alkyl group with at least six carbon atoms is combined with an optional cyclic alkyl (meth)acrylate within the first monomer composition. As used herein, the term "cyclic alkyl" refers to a mono-cyclic alkyl, a bicyclic alkyl, or a tricyclic alkyl group. Examples of cyclic alkyl (meth)acrylate monomers include, but are not limited to, isobornyl (meth)acrylate, 3,3,5-trimethylcyclohexyl (meth) acrylate, cyclohexyl (meth)acrylate, adamantyl (meth)acrylate 3,5-dimethyladamantyl (meth)acrylate, and 4-tert-butyl-cylcohexyl (meth)acrylate.

Some of these cyclic alkyl (meth)acrylates have a high glass transition temperature (such as at least 80° C.) and must be used in sufficiently low amounts so that the polymerized product of the first monomer composition has a glass transition temperature no greater than 20° C. The presence of the cyclic alkyl (meth)acrylate can enhance the solubility of the second (meth)acrylate polymer within the first monomer composition. In many embodiments that contain the optional cyclic alkyl (meth)acrylate, the first monomer composition contains at least 0.5 weight percent, at least 1 weight percent, at least 2 weight percent, at least 5 weight percent, or at least 10 weight percent of the cyclic alkyl (meth)acrylate. The amount of the cyclic alkyl (meth)acrylate can be up to 30 weight percent, up to 25 weight percent, up to 20 weight percent, or up to 15 weight percent. For example, the amount of the cyclic alkyl (meth)acrylate in the first monomer composition can be in a range of 0 to 30 weight percent, 1 to 30 weight percent, 0 to 20 weight percent, 1 to 20 weight percent, or 5 to 20 weight percent. The weight percent of the cyclic alkyl (meth)acrylate is based on a total weight of monomers in the first monomer composition.

The first monomer composition optionally can include a polar monomer such as an optional acid-containing monomer (i.e., a monomer with an acidic group) or an optional hydroxyl-containing monomer (i.e., a monomer with a hydroxyl group). These optional monomers can be added to increase the cohesive strength of the final polymeric material. Suitable optional acid-containing monomers include, but are not limited to, (meth)acrylic acid, itaconic acid, maleic acid, 2-carboxyethyl acrylate, crotonic acid, citraconic acid, maleic acid, maleic anhydride (which hydrolyzes to have two carboxylic acid groups), oleic acid, and mono-2-acryloyloxyethyl succinate. Suitable optional hydroxyl-containing monomers include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), or hydroxyalkyl (meth)acrylamides (e.g., 2-hydroxyethyl (meth)acrylamide or 3-hydroxypropyl (meth)acrylamide). In many embodiments, the polar monomer is an acidic monomer. In many embodiments, the optional polar monomer has a (meth)acryloyl group. The first monomer composition typically contains 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent of the optional polar monomer. The amount of the optional polar monomer used is selected so that at least 85 weight percent of the monomers in the first monomer composition are within the droplets of the second phase. The weight percent is based on the total weight of monomers within the first monomer composition.

The first monomer composition optionally can contain up to 20 weight percent alkyl (meth)acrylate having an alkyl group with one to five carbon atoms. The alkyl group can be linear or branched. If larger amounts of an alkyl (meth) acrylate having an alkyl group with one to five carbon atoms are used, too much of the overall first monomer composition may be in the first phase rather than in the droplets. In many embodiments, the amount of alkyl (meth)acrylate having an alkyl group with one to five carbon atoms is present in an amount no greater than 15 weight percent, no greater than 10 weight percent, or no greater than 5 weight percent. In some embodiments, there is no alkyl (meth)acrylate having an alkyl group with one to five carbon atoms. In other embodiments, the first monomer composition can contain at least 0.5 weight percent, at least 1 weight percent, at least 2 weight percent, or at least 5 weight percent of the alkyl (meth)acrylate having an alkyl group with one to five carbon atoms. The amount of the alkyl (meth)acrylate with an alkyl group having one to five carbon atoms is usually in a range of 0 to 20 weight percent, 1 to 20 weight percent, 5 to 20 weight percent, 10 to 20 weight percent, 0 to 15 weight percent, 1 to 15 weight percent, 5 to 15 weigh percent, 0 to 10 weight percent, 1 to 10 weight percent, 0 to 5 weight percent, or 1 to 5 weight percent. The amount of the alkyl (meth)acrylate is based on a total weight of monomers in the first monomer composition.

The first monomer composition can contain 50 to 100 weight percent of the alkyl (meth)acrylate having a linear or branched alkyl group with at least six carbon atoms, 0 to 30 weight percent of a cyclic alkyl (meth)acrylate, 0 to 20 weight percent of the alkyl (meth)acrylate having an alkyl group with one to five carbon atoms, and 0 to 15 weight percent of a polar monomer. In some examples, the first monomer composition contains 60 to 98 weight percent of the alkyl (meth)acrylate having a linear or branched alkyl group with at least six carbon atoms, 1 to 25 weight percent of a cyclic alkyl (meth)acrylate, 0 to 15 weight percent of the alkyl (meth)acrylate having an alkyl group with one to five carbon atoms, and 1 to 15 weight percent of the polar monomer. In some examples, the first monomer composition contains 70 to 98 weight percent of the alkyl (meth)acrylate having a linear or branched alkyl group with at least six carbon atoms, 1 to 20 weight percent of a cyclic alkyl (meth)acrylate, 0 to 10 weight percent of the alkyl (meth) acrylate having an alkyl group with one to five carbon atoms, and 1 to 10 weight percent of the polar monomer.

In other examples, the first monomer composition contains 60 to 98 weight percent of the alkyl (meth)acrylate having a linear or branched alkyl group with at least six carbon atoms, 1 to 30 weight percent of a cyclic alkyl (meth)acrylate, and 1 to 10 weight percent of the polar monomer. For example, the first monomer composition contains 70 to 98 weight percent of the alkyl (meth)acrylate having a linear or branched alkyl group with at least six carbon atoms, 1 to 20 weight percent of a cyclic (meth) acrylate, and 1 to 10 weight percent of the polar monomer such as a (meth)acrylic acid.

The emulsion composition has droplets dispersed in the first phase. Prior to polymerization of the emulsion composition to form a latex composition, the droplets contain a solution of the second (meth)acrylate polymer dissolved in the components of the first monomer composition that are in the droplets. Typically, at least 90 weight percent of the monomers in the first monomer composition are within the droplets of the emulsion and no more than 10 weight percent of the monomers of the first composition are within the first phase of the emulsion composition. Polar monomers or other monomers that are less hydrophobic than the alkyl (meth)acrylate having a linear or branched alkyl group with at least six carbon atoms may be distributed within both the droplets and the first phase. As polymerization proceeds, any of these polar monomers or less hydrophobic monomers in the first phase may diffuse into the droplets and become part of the polymeric latex particles. In some embodiments, at least 92 weight percent, at least 95 weight percent, at least 98 weight percent, or at least 99 weight percent of the monomers in the first monomer composition are in the droplets of the emulsion composition.

The second (meth)acrylate polymer is selected so that is can be dissolved in the first monomer composition within the droplets of the emulsion composition and so that it is not miscible with the first phase. The second (meth)acrylate polymer is formed prior to dissolution by the components of the first monomer composition within the droplets. The second (meth)acrylate polymer facilitates the formation of stable droplets within the first phase of the emulsion composition.

The second (meth)acrylate polymer is typically formed from a second monomer composition. The second monomer composition is selected to provide a second (meth)acrylate polymer that can be dissolved in the first monomer composition. The second monomer composition is not identical to the first monomer composition. Additionally, it is often desirable that the second (meth)acrylate polymer be distributed fairly uniformly throughout the droplets within the emulsion composition. That is, it is often desirable that the second (meth)acrylate polymer and the polymeric material formed by polymerization of the first monomer composition (i.e., the first (meth)acrylate polymer) are both fairly uniformly distributed throughout the resulting polymeric latex particles even though their compositions are not identical. The first (meth)acrylate polymer and the second (meth) acrylate polymer are within the same latex particles.

The second monomer composition is selected to provide a second (meth)acrylate polymer that has a glass transition temperature that is at least 50° C. as measured using Differential Scanning Calorimetry (e.g., Modulated Differential Calorimetry). For example, the glass transition temperature is at least 60° C., at least 70° C., at least 80° C., at least 90° C., or at least 100° C. The glass transition temperature can be up to 250° C., up to 200° C., or up to 175° C. Often, the glass transition temperature is no greater than 150° C., no greater than 140° C., no greater than 130° C., or no greater than 120° C.

The second monomer composition usually includes at least 50 weight percent of a cyclic alkyl (meth)acrylate based on a total weight of monomers in the second monomer composition, wherein the cyclic group has at least six carbon atoms. For example, the cyclic group can have up to 12 carbon atoms, up to 10 carbon atoms, or up to 8 carbon atoms. Examples of cyclic alkyl (meth)acrylate monomers include, but are not limited to, isobornyl (meth)acrylate, 3,3,5-trimethylcyclohexyl (meth)acrylate, cyclohexyl (meth)acrylate, adamantyl (meth)acrylate, 3,5-dimethyladamantyl (meth)acrylate, and 4-tert-butylcylcohexyl (meth) acrylate.

In many embodiments, the cyclic alkyl (meth)acrylate has a glass transition temperature that is at least 80° C. when polymerized as a homopolymer. Suitable monomers include, but are not limited to, isobornyl (meth)acrylate, 3,3,5-trimethylcyclohexyl methacrylate, cyclohexyl methacrylate, 3,5-dimethyladamantyl acrylate, and 4-tert-butylcylcohexyl methacrylate.

The cyclic alkyl (meth)acrylate can be the only monomer in the second monomer composition or it can be combined with other optional monomers provided that 1) the resulting second (meth)acrylate polymer has a glass transition temperature equal to at least 50° C. as measured using Differential Scanning Calorimetry (e.g., Modulated Differential Scanning Calorimetry), 2) the resulting second (meth)acrylate polymer can be dissolved in the first monomer composition, and 3) the second (meth)acrylate polymer remains within the droplets of the emulsion composition and is not miscible with the first phase of the emulsion composition. These optional monomers include, for example, a polar monomer, an alkyl (meth)acrylate having a linear or branched alkyl group, (meth)acrylamide, a (meth)acrylonitrile, an N-alkyl (meth)acrylamide, an N,N-dialkyl (meth) acrylamide, and a vinyl monomer that does not have a (meth)acryloyl group.

The second monomer composition can optionally include a polar monomer such as an optional acid-containing monomer (i.e., a monomer with an acidic group) or an optional hydroxyl-containing monomer (i.e., a monomer with a hydroxyl group). Suitable optional acid-containing monomers include, but are not limited to, (meth)acrylic acid, itaconic acid, maleic acid, 2-carboxyethyl acrylate, crotonic acid, citraconic acid, maleic acid, maleic anhydride (which hydrolyzes to have two carboxylic acid groups), oleic acid, and mono-2-acryloyloxyethyl succinate. Suitable optional hydroxyl-containing monomers include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth) acrylate), or hydroxyalkyl (meth)acrylamides (e.g., 2-hydroxyethyl (meth)acrylamide or 3-hydroxypropyl (meth) acrylamide). In many embodiments, the optional polar monomer has a (meth)acryloyl group. In many embodiments, the optional polar monomer is (meth)acrylic acid. The second monomer composition typically contains 0 to 10 weight percent, 1 to 10 weight percent, 0 to 5 weight percent, or 1 to 5 weight percent of the optional acid-containing monomer and/or optional hydroxyl-containing monomer. The weight percent values are based on the total weight of monomers within the second monomer composition.

The second monomer composition can optionally include an alkyl (meth)acrylate having a linear or branched alkyl group. Example monomers include methyl (meth)acrylate, ethyl (meth)acrylate, isopropyl (meth)acrylate, isobutyl (meth)acrylate, n-butyl (meth)acrylate, tert-butyl (meth) acrylate, n-pentyl (meth)acrylate, isopentyl (meth)acrylate, 2-methylbutyl (meth)acrylate, n-hexyl (meth)acrylate, 4-methyl-2-pentyl (meth)acrylate, 2-methylhexyl (meth) acrylate, 2-ethylhexyl (meth)acrylate, isooctyl (meth)acrylate, n-octyl (meth)acrylate, 2-octyl (meth)acrylate, isononyl (meth)acrylate, isoamyl (meth)acrylate, n-decyl (meth)acrylate, isodecyl (meth)acrylate, 2-propylheptyl (meth)acrylate, isotridecyl (meth)acrylate, and lauryl (meth)acrylate. The amount of the alkyl methacrylate is often limited by the desired glass transition temperature of the second (meth) acrylate polymer.

Other suitable optional monomers for use in second monomer composition include (meth)acrylamide, (meth) acrylonitrile, an N-alkyl (meth)acrylamide having an alkyl group with 1 to 10 carbon atoms (e.g., 2 to 10 carbon atoms or 4 to 10 carbon atoms) such as N-octyl acrylamide, N-isopropyl acrylamide, or N-tert-butyl acrylamide, or an N,N-dialkyl (meth)acrylamide having alkyl groups with 1 to 10 carbon atoms (e.g., 1 to 6 carbon atoms or 1 to 4 carbon atoms) such as N,N-dimethyl acrylamide.

Still other optional monomers can be included in the second monomer composition provided that there is suitable compatibility between the resulting second (meth)acrylate polymer and first monomer composition within the emulsion composition and provided that the second (meth)acrylate polymer can be dissolved within the droplets of the emulsion composition. Examples of other optional monomers include various vinyl monomers, wherein the vinyl group is not a (meth)acryloyl group. Optional vinyl monomers include, for example, vinyl esters such as vinyl butyrate, and various vinyl non-aromatic heterocyclic monomers such as N-vinyl pyrollidone and N-vinyl caprolactam.

A crosslinking monomer typically is not included in the second monomer composition. A crosslinked (meth)acrylate polymer would be difficult to dissolve in the first monomer composition. In many embodiments, the second monomer composition does not contain an aromatic monomer (i.e., a monomer with an aromatic group such as a styrenic monomer or aryl (meth)acrylate).

In many embodiments, the second monomer composition includes 50 to 100 weight percent of a cyclic alkyl (meth) acrylate and 0 to 50 percent optional monomers such as those selected from a polar monomer, an alkyl (meth) acrylate having a linear or branched alkyl group, and a vinyl monomer that does not have a (meth)acryloyl group, (meth) acrylamide, (meth)acrylonitrile, N-alkyl (meth)acrylamide, N,N-dialkyl (meth)acrylamide, and a mixture thereof. For example, the second monomer composition can include 60 to 100 weight percent of the cyclic alkyl (meth)acrylate and 0 to 40 percent optional monomers, 70 to 100 weight percent of the cyclic alkyl (meth)acrylate and 0 to 30 percent optional monomers, 80 to 100 weight percent of the cyclic alkyl (meth)acrylate and 0 to 20 percent optional monomers, 90 to 100 weight percent of the cyclic alkyl (meth)acrylate and 0 to 10 percent optional monomers, 90 to 99 weight percent of the cyclic alkyl (meth)acrylate and 1 to 10 percent optional monomers, 95 to 100 weight percent of the cyclic alkyl (meth)acrylate and 0 to 5 percent optional monomers, or 95 to 99 weight percent of the cyclic alkyl (meth)acrylate and 1 to 5 percent optional monomers. The weight percents are based on the total weight of monomers within the second monomer composition.

In some more specific embodiments, the second monomer composition contains 1) 50 to 100 weight percent of the cyclic alkyl (meth)acrylate, 2) 0 to 50 weight percent of a second monomer selected from an alkyl (meth)acrylate having a linear or branched alkyl group, and a vinyl monomer that does not have a (meth)acryloyl group, (meth) acrylamide, (meth)acrylonitrile, N-alkyl (meth)acrylamide, and N,N-dialkyl (meth)acrylamide, and 3) 0 to 10 weight percent of a polar monomer. For example, the second monomer composition contains 1) 50 to 99 weight percent of the cyclic alkyl (meth)acrylate, 2) 0 to 50 weight percent of the second monomer, and 3) 1 to 10 weight percent of a polar monomer; or 1) 50 to 99 weight percent of the cyclic alkyl (meth)acrylate, 2) 0 to 40 weight percent of the second monomer, and 3) 1 to 10 weight percent of a polar monomer; or 1) 70 to 99 weight percent of the cyclic alkyl (meth) acrylate, 2) 0 to 20 weight percent of the second monomer, and 3) 1 to 10 weight percent of a polar monomer.

In some particular embodiments, the second monomer composition contains 90 to 99 weight percent of the cyclic alkyl (meth)acrylate and 1 to 10 percent polar monomer, 95 to 100 weight percent of the cyclic alkyl (meth)acrylate and 0 to 5 percent polar, or 95 to 99 weight percent of the cyclic alkyl (meth)acrylate and 1 to 5 percent polar. The weight percents are based on the total weight of monomers within the second monomer composition. In many embodiments, the polar monomer is an acid-containing monomer such as, for example, a (meth)acrylic acid.

In addition to the second monomer composition, the polymerizable composition used to form the second (meth) acrylate polymer often contains a chain transfer agent. The chain transfer agent is used to control the molecular weight of the second (meth)acrylate polymer. Examples of useful chain transfer agents include, but are not limited to, carbon tetrabromide, alcohols (e.g., ethanol and isopropanol), thiols (e.g., lauryl mercaptan, butyl mercaptan, ethanethiol, isooctylthioglycolate, 2-ethylhexyl thioglycolate, 2-ethylhexyl mercaptopropionate, ethyleneglycol bisthioglycolate), and mixtures thereof. In many embodiments, the preferred chain transfer agent is iso-octyl thioglycolate (IOTG), carbon tetrabromide, tert-dodecylmercaptan (TDDM), or n-dodecylmercaptan. The amount of the optional chain transfer agent is often in a range of 0 to 5 weight percent based on the total weight of monomers in the second monomer composition. If present, the chain transfer agent is often used in an amount of at least 0.01 weight percent, at least 0.02 weight percent, at least 0.05 weight percent, or at least 0.1 weight percent. The amount can be up to 5 weight percent, up to 3 weight percent, up to 2 weight percent, up to 1 weight percent, or up to 0.5 weight percent.

Other optional components can be added along with the second monomer composition to the polymerizable composition used to form the high second (meth)acrylate polymer. For example, the polymerizable composition can include an inhibitor and/or antioxidant. Suitable inhibitors and/or antioxidants include, but are not limited to, mono-methyl ether of hydroquinone (MEQH) and pentaerythritol tetrakis (3-(3, 5-di-tert-butyl-4-hydroxyphenyl) propionate), which is commercially available from BASF (Florham Park, N.J., USA) under the trade designation IRGANOX 1010.

The polymerizable composition used to form the second (meth)acrylate polymer typically includes a free radical initiator to commence polymerization of the monomers. The free radical initiator can be a photoinitor or a thermal initiator. The free radical initiator is typically present in an amount up to 5 weight percent based on the total weight of the monomers in the second monomer composition. In some embodiments, the amount of free radical initiator is up to 4 weight percent, up to 3 weight percent, up to 2 weight percent, or up to 1 weight percent. The amount of free radical initiator included in the polymerizable composition is typically at least 0.005 weight percent. For example, the polymerizable composition often contains at least 0.01 weight percent, at least 0.02 weight percent, at least 0.05 weight percent, at least 0.1 weight percent, at least 0.2 weight percent, or at least 0.5 weight percent free radical initiator.

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is 2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa., USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)- 3-hexyne); various hydroperoxides such as tert-amyl hydroperoxide and tert-butyl hydroperoxide; and mixtures thereof.

In some embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(2,4, 6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA)).

Additionally, an organic solvent can be added, if desired, to control the viscosity of the polymerizable composition used to form the second (meth)acrylate polymer. The amount of organic solvent, if any, is typically determined by the polymerization method. In some solvent-based polymerization methods, the polymerizable composition can contain up to 70 weight percent organic solvent. For adiabatic polymerization methods, however, the amount of organic solvent is typically no greater than 10 weight percent, no greater than 8 weight percent, no greater than 5 weight percent, no greater than 3 weight percent, or no greater than 1 weight percent of the polymerizable composition. Any organic solvent used in the polymerizable composition is typically removed at the completion of the polymerization reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof. In many embodiments (such in some adiabatic polymerization processes), the polymerization occurs with little or no organic solvent present.

The monomers used to form the second (meth)acrylate polymer can be polymerized using any suitable method such as, for example, solution (i.e., with a solvent) polymerization, dispersion polymerization, suspension polymerization, and solventless polymerization (for example, bulk polymerization with either UV or thermal initiator). The polymerization can occur in a single step or in multiple steps. That is, all or a portion of the polymerizable composition may be charged into a suitable reaction vessel and polymerized. If multiple steps are used, an initial charge of monomers and initiator are added to the reactor. After polymerization of the initial charge, another portion of any remaining monomers and/or initiator are added. Multiple polymerization steps can help narrow the polydispersity of the polymerized product (e.g., the amount of low molecular weight chains can be reduced), can help minimize or control the heat of reaction, and can allow for adjustment of the type and amount of monomer available during polymerization.

In many embodiments, the second (meth)acrylate polymer is not formed using emulsion or dispersion polymerization methods. Rather, the second (meth)acrylate polymer is prepared using a solventless bulk polymerization method or a solution polymerization method. Either a thermal initiator or a photoinitiator can be used. In some embodiments, polymerization occurs using an adiabatic process as described, for example, in U.S. Pat. No. 5,986,011 (Ellis et al.) and U.S. Pat. No. 5,637,646 (Ellis). A thermal initiator is used with this process.

The weight average molecular weight of the second (meth)acrylate polymer is typically at least 3,000 grams/mole. If the weight average molecular weight is lower, the resulting pressure-sensitive adhesive may have an unacceptably low cohesive strength. The second (meth)acrylate polymer often has a weight average molecular weight of at least 5,000 grams/mole, at least 10,000 grams/mole, or at least 20,000 grams/mole. The weight average molecular weight can be up to 150,000 grams/mole. If the molecular weight is higher, the second (meth)acrylate polymer might not dissolve in the first monomer composition of the emulsion composition. If not dissolved in the first monomer composition, the second (meth)acrylate polymer can undesirably be present in separate droplets from the first monomer composition within the emulsion composition and/or can phase separate during polymerization. The weight average molecular weight is often up to 120,000 grams/mole, up to 100,000 grams/mole, up to 80,000 grams/mole, up to 60,000 grams/mole, or up to 50,000 grams/mole. For example, the weight average molecular weight can be in a range of 3,000 to 150,000 grams/mole, in the range of 10,000 to 150,000 grams/mole, in a range of 3,000 to 100,000 grams/mole, in the range of 10,000 to 100,000 grams/mole, in a range of 3,000 to 50,000 grams/mole, or in the range of 10,000 to 50,000 grams/mole.

The second (meth)acrylate polymer is added to the emulsion composition. That is, this polymeric material is prepared prior to combination with the other components of the emulsion composition. The second (meth)acrylate polymer typically does not undergo further free radical polymerization within the emulsion composition or with other components of the emulsion composition. The second (meth)acrylate can, however, undergo a crosslinking reaction within the emulsion composition.

The second (meth)acrylate polymer is usually added to the emulsion composition after being dissolved in the first monomer composition. That is, a solution containing the second (meth)acrylate polymer and the first monomer composition are added together to the first phase of the emulsion. The solution is typically added under conditions of high shear mixing to form droplets suspended within the first phase. In some embodiments, the second (meth)acrylate polymer is initially dissolved in a portion of the first monomer composition and then the resulting polymer solution is then mixed with the remaining monomers of the first monomer composition.

The amount of second (meth)acrylate polymer added to the emulsion composition is typically at least 0.5 weight percent or at least 1 weight percent. If a lower amount of the second (meth)acrylate polymer is added, the stability of the emulsion composition may be poor. That is, it can be difficult to form and maintain droplets in the emulsion composition. In some embodiments, the emulsion composition contains at least 2 weight percent, at least 3 weight percent, or at least 5 weight percent of the second (meth) acrylate polymer. The amount of the second (meth)acrylate polymer added is typically up to 15 weight percent. If a higher amount of the second (meth)acrylate polymer is added, the polymerization of the first monomer composition within the droplets may be undesirably slow. Additionally, the polymeric material formed from the first monomer composition may have an undesirably low molecular weight and the resulting pressure-sensitive adhesive may have an undesirably low cohesive strength. In some embodiments, the emulsion composition contains up to 12 weight percent, up to 10 weight percent, or up to 8 weight percent of the second (meth)acrylate polymer. The weight percents are based on a total weight of the first monomer composition in the emulsion composition (i.e., the total weight of monomers in the first monomer composition).

The emulsion composition contains both the first monomer composition and the second (meth)acrylate polymer within the same droplets. More specifically, the emulsion composition often contains 0.5 to 15 weight percent of the second (meth)acrylate polymer and 85 to 99.5 weight percent first monomer composition based on the total weight of the second (meth)acrylate polymer plus the weight of monomers in the first monomer composition (this does not include the small amount of polymerizable surfactant). This is the total polymerized and polymerizable material in the emulsion composition. Most of this polymerized and polymerizable material are present within the droplets of the emulsion (e.g., some of the acidic monomers may be dissolved in the first phase). In some examples, the emulsion composition can contain 1 to 15 weight percent of the second (meth) acrylate polymer and 85 to 99 weight percent of the first monomer composition, 2 to 12 weight percent of the second (meth)acrylate polymer and 88 to 98 weight percent first monomer composition, 2 to 10 weight percent of the second (meth)acrylate polymer and 90 to 98 weight percent first monomer composition, or 2 to 8 weight percent of the second (meth)acrylate polymer and 92 to 98 weight percent first monomer composition based on the total weight of the second (meth)acrylate polymer plus the weight of monomers in the first monomer composition.

In some particular embodiments, the first monomer composition contains a mixture of one or more alkyl (meth) acrylates having a linear or branched alkyl group with at least six carbon atoms, one or more cyclic alkyl (meth) acrylates, and one or more (meth)acrylic acids. The second (meth)acrylate is formed from a second monomer composition that contains one or more cyclic alkyl (meth)acrylates and one or more (meth)acrylic acids.

Other optional reactants can be included in the emulsion composition. For example, in some embodiments, a crosslinker is added that can react with multiple carboxylic acid groups (—COOH). The carboxylic acid groups can be on the second (meth)acrylate polymer, on the polymeric material formed from the first monomer composition, or on a combination of both polymeric materials. The use of the optional crosslinkers may increase the shear strength of the resulting pressure-sensitive adhesive.

Suitable crosslinkers capable of reacting with multiple carboxylic acid groups include, but are not limited to, polyoxazolines such as those commercially available under the trade designation EPOCROS from Nippon Shokubai Co., LTD (Japan), polyaziridines (e.g., trimehtylolpropane tris(2-methyl-1aziridine propionate from PolyAziridine LCC (Medford, N.J., USA)), polyamines, or the like. Other suitable crosslinkers include metal salts that can complex with multiple carboxylic acid groups. Suitable metals include, for example, zinc salts. If used, the optional crosslinker is often added in an amount equal to at least 0.01 weight percent based on the total weight of monomers in the first monomer composition. For example, the emulsion can contain at least 0.05 weight percent, at least 0.1 weight percent, or at least 0.5 weight percent of the crosslinker. The amount of the optional crosslinker is often up to 3 weight percent based on the total weight of monomers in the first monomer composition. For example, the emulsion composition can contain up to 2.5 weight percent, up to 2 weight percent, up to 1.5 weight percent, or up to 1 weight percent of the optional crosslinker.

In many embodiments, an optional neutralizing agent is added to the emulsion composition. The neutralizing agent can be added, for example, to improve the reactivity of the crosslinker, to improve the stability of the resulting latex composition, or the like. Suitable neutralizing agents are often strong or weak bases such as, for example, ammonium hydroxide, ammonia, sodium acetate, potassium acetate, sodium hydroxide, potassium hydroxide, and lithium hydroxide. The neutralizing agent is often added to increase the pH of the emulsion composition to at least 4.0, at least 4.5, at least 5.0, at least 5.5, at least 6.0, at least 6.5, or at least 7.0.

The emulsion composition typically further includes an initiator. While either a water soluble or oil soluble initiator can be used, the initiator is typically selected to be soluble in water. If the initiator is oil soluble, it is typically added to the mixture (solution) of monomers of the first monomer composition and the second (meth)acrylate polymer before this mixture (solution) is combined with the first phase of the emulsion composition. If the initiator is water soluble, it is often added after formation of the droplets within the first phase of the emulsion composition. If a reducing agent is used, it is usually water soluble and is added to the first phase.

Examples of water soluble initiators include, but are not limited to, hydrogen peroxide and various persulfate salts such as sodium persulfate, potassium persulfate, and ammonium persulfate. Optional reducing agents can be added to lower the temperature needed for initiation of the polymerization reaction. Suitable reducing agents include, but are not limited to, ascorbic acid, bisulfite salts (e.g., sodium bisulfite, potassium bisulfite, and ammonium bisulfite), and sodium formaldehyde sulfoxylate. The amount of initiator and optional reducing agent can each be up to 1 weight percent based on the weight of monomers in the first monomer composition. For example, the amounts can be up to 0.8 weight percent, up to 0.5 weight percent, up to 0.3 weight percent, or up to 0.2 weight percent based on a total weight of monomers in the first monomer composition. The amount is initiator and optional reducing agent each can be at least 0.01 weight percent, at least 0.05 weight percent, or at least 0.1 weight percent based on the total weight of monomers in the first monomer composition.

Examples of oil soluble initiators include, but are not limited to, azo compounds or peroxides such as those mentioned above for the formation of the second (meth) acrylate polymer. If such initiators are used, they are used in the same amount as described above for water soluble initiators.

In many emulsion compositions, a chain transfer agent is not used. As described above, however, a chain transfer agent can be used (and usually is used) in the formation of the second (meth)acrylate polymer.

The emulsion composition does not include a tackifier.

The emulsion composition can be prepared by any suitable process that results in the formation of droplets containing the second (meth)acrylate polymer dissolved in monomers of the first monomer composition. In many embodiments, the second (meth)acrylate polymer is initially mixed with monomers included in the first monomer composition. The monomers are often used in their neat form without the addition of any solvent. Once the second (meth) acrylate polymer has dissolved, the mixture (solution) is combined with water or with water and other components of the emulsion composition using high shear mixing. In some embodiments, the polymerizable surfactant and neutralizing agent can be dissolved in (or combined with) the water prior to mixing.

With high shear mixing, droplets form within the first phase (i.e., aqueous phase). Prior to any polymerization of the first monomer composition, the droplets contain a mixture of i) the second (meth)acrylate polymer and ii) at least 90 weight percent of the first monomer composition, wherein the second (meth)acrylate polymer is dissolved in the first monomer composition within the droplets. Typically, the droplets include at least 92 weight percent, at least 95 weight percent, at least 97 weight percent, at least 98 weight percent, or at least 99 weight percent of the monomers in the first monomer composition. The polymerizable surfactant is likely to be at the interface between the droplets and the first phase or dissolved in first phase. Most of the polymerizable surfactant is likely to be at the interface. In many embodiments, any initiator, and/or reducing agent, and/or neutralizing agent included in the emulsion composition are likely to be dissolved in the first phase.

The droplets suspended in the first phase typically have an average diameter up to about 2000 nanometers, up to 1500 nanometers, up to 1000 nanometers, up to 900 nanometers, up to 800 nanometers, up to 700 nanometers, up to 600 nanometers, or up to 500 nanometers. The average diameter is typically at least 100 nanometers, at least 200 nanometers, at least 300 nanometers, or at least 400 nanometers. The average size can be determined using dynamic light scattering methods. In some embodiments, the average droplet size (diameter) is in a range of 100 to 2000 nanometers, in a range of 200 to 1000 nanometers, in a range of 300 to 1000 nanometers, in a range of 200 to 800 nanometers, or in a range of 400 to 700 nanometers.

In many embodiments, the emulsion composition is considered to be a mini-emulsion. As used herein, the term "mini-emulsion" refers to an emulsion method that uses high shear to make droplets having an average diameter no greater than 1 micrometer. Polymerization occurs within the droplets to form polymeric latex particles. Polymerization is limited to that which occurs within the droplets.

The first monomer composition is typically polymerized at room temperature (e.g., about 20° C. to about 25° C.) or at a temperature above room temperature. The temperature is often at least 30° C., at least 40° C., or at least 50° C. The temperature can be up to the boiling temperature of the emulsion composition (e.g., about 100° C.). In some embodiments, the temperature can be up to 80° C., up to 70° C., or up to 60° C. Any heat generated during polymerization is rapidly moderated by the effect of the heat capacity of the first phase. The reaction time can be any length of time needed to complete the polymerization reaction. In some embodiments, the reaction time can be at least 1 hour, at least 2 hours, at least 3 hours, or at least 4 hours. The reaction time is up to 24 hours or longer, up to 16 hours, or up to 8 hours. The reactor is often purged with an inert gas such as nitrogen.

The polymerized product of the emulsion composition is a latex composition. That is, the latex composition contains water and polymeric particles that are a polymerized product of the emulsion composition as described above. The terms "latex" and "latex composition" may be used interchangeably. The terms "polymeric particle" and "latex particles" and "polymeric latex particles" may be used interchangeably. Both i) the second (meth)acrylate polymer plus ii) the polymerized product of the first monomer composition (the first (meth)acrylate polymer) are present within the same latex particles. The latex composition contains latex particles having an average size comparable to the average size of the droplets within the emulsion composition prior to polymerization. More particularly, the average particle size of the latex particles is roughly equal to or slightly larger than the average droplet size within the emulsion composition due to density differences.

The latex particles are typically suspended (e.g., dispersed) in the water phase (first phase). Preferably, the latex particles are not coagulated together. The latex particles include both the second (meth)acrylate polymer and the first (meth)acrylate polymer. The molecular weight of the first (meth)acrylate polymer is typically higher than the molecular weight of polymeric materials of the same overall chemical composition formed using other processes. More specifically, the molecular weight of the first (meth)acrylate polymer formed by emulsion polymerization can be close to 1 million Daltons.

In contrast to the emulsion polymerization method used to form the first (meth)acrylate polymer, a typical molecular weight of polymers formed from the same monomers using solution polymerization or bulk polymerization methods is often less than 500,000 Daltons. With both solution polymerization and bulk polymerization methods, the molecular weight is usually controlled by the initiator concentration. That is, higher initiator concentrations tend to produce lower molecular weight polymers. Therefore, in order to produce high molecular weight polymers using solution polymerization or bulk polymerization methods, extremely low initiator concentrations are required. However, if extremely low initiator concentrations are used, the polymerization time may be unacceptably long. Such processes may be economically impractical to prepare high molecular weight polymeric materials. The high molecular weight polymeric materials, however, are often desirable for some adhesive applications such as where high shear strength is necessary.

With emulsion polymerization methods, the molecular weight of the polymeric material (e.g., the molecular weight of the first (meth)acrylate polymer) can be controlled by both initiator concentration and the number of particles (i.e., number of droplets in the emulsion). Higher initiator concentrations often result in lower molecular weights and faster reaction times. Higher particle numbers, however, tend to favor higher molecular weights and faster reaction times.

Due to the high molecular weight of the polymeric materials formed from emulsion compositions, crosslinking structures can often form more easily compared to polymeric materials formed using solution polymerization and bulk polymerization methods even in the absence of additional crosslinkers. Two possible types of crosslinking can occur in the polymeric materials formed by emulsion polymerization: 1) physical entanglement and 2) chemical crosslinking due to the chain transfer reactions to a polymeric chain. Physical entanglement can be enhanced with longer polymeric chains resulting from the increased average molecular weight. Chain transfer reactions can form crosslinking structures for long polymeric chains.

The latex particles typically have a single glass transition temperature as determined using a Differential Scanning Calorimeter. More specifically, there is a single peak in the plot of reversible heat flow versus temperature for the dry polymeric material (dry polymeric latex particles) during the second heating cycle using Modulated Differential Scanning Calorimetry. The $T_g$ is typically no greater than 0° C., no greater than −10° C., or no greater than −20° C.

The latex composition can be combined with an optional tackifier. The addition of a tackifier can be used to increase adhesion. Any suitable tackifier can be used such as rosin acids and their derivatives (e.g., rosin esters); terpene resins such as polyterpenes (e.g., alpha pinene-based resins, beta pinene-based resins, and limonene-based resins, and aromatic-modified polyterpene resins (e.g., phenol modified polyterpene resins)); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

In many embodiments, the tackifier is a rosin ester or includes a rosin ester. Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Often, it is desirable to use a tackifier that can be dispersed in water. Water dispersion of rosin esters are available under the trade designation SNOWTACK from Lawter, Inc. (Chicago, Ill., USA). Other suitable water dispersed tackifiers are commercially available under the trade designation TACOLYN from Eastman Chemical Company that include, for example, rosin ester resin dispersions, hydrogenated rosin ester resin dispersions, aliphatic hydrocarbon resin dispersions, and aromatic modified hydrocarbon resin dispersion.

If present, the optional tackifier in the latex composition is often used in an amount in a range of 1 to 40 weight percent based on the total weight of the polymeric latex particles. In some embodiments, the amount of tackifier is at least 5 weight percent, or at least 10 weight percent and can be up to 35 weight percent, up to 30 weight percent, up to 25 weight percent, or up to 20 weight percent.

Other optional components that can be added to the latex composition are thickeners. Example thickeners are typically aqueous polymer solutions such as those available under the trade designation PARAGUM from Royal Coatings and Specialty Polymers (South Bend, Ind., USA). If added, the optional thickeners can be used in an amount up to 5 weight percent based on the total weight of the latex composition (e.g., water and polymeric latex particles). For example, the thickener can be used in an amount up to 4 weight percent, up to 3 weight percent, up to 2 weight percent, or up to 1 weight percent. In some embodiments, the thickener is in a range of 0 to 5 weight percent, 0.1 to 5 weight percent, 0.1 to 2 weight percent, 0.1 to 1 weight percent, 0.2 to 0.8 weight percent, or 0.4 to 0.6 weight percent.

The latex composition typically is dried to form a pressure-sensitive adhesive. The compositions are typically dried to remove at least 90 weight percent of the water. For example, at least 95 weight percent, at least 97 weight percent, at least 98 weight percent, or at least 99 weight percent of the water is removed. The water content of the dried pressure-sensitive adhesive many increase or decrease depending on the environmental humidity. In some embodiments, the latex composition is coated on a substrate such as a backing layer or release liner prior to drying. Drying typically occurs at temperatures above room temperature but not at a temperature that would distort or degrade the substrate and/or the pressure-sensitive adhesive layer. In some embodiments, the drying occurs at temperatures in a range of about 40° C. to about 120° C. and for a time sufficient to lower the water content to the desired level.

The pressure-sensitive adhesive layer can have any desired thickness. In many embodiments, the adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the adhesive layer can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The pressure-sensitive adhesives can have a good balance of peel strength and adhesive strength. The presence of the second (meth)acrylate polymer in the droplets of the emulsion may contribute to this good balance. Without the use of the second (meth)acrylate in the emulsion composition, it can be difficult to prepare pressure-sensitive adhesives with this good balance. That is, the peel strength can be increased while maintaining good cohesive strength. Likewise, the cohesive strength can be increased while maintaining good peel strength.

Various types of articles can be prepared that include a substrate and a pressure-sensitive adhesive layer positioned adjacent to (and adhered to) a major surface of the substrate. Any suitable substrate can be used in the article and the substrate is often selected depending on the particular application. For example, the substrate can be flexible or inflexible and can be formed from a polymeric material, glass or ceramic material, metal or metal alloy, or combination thereof. Some substrates are polymeric materials such as those prepared, for example, from polyolefins (e.g., polyethylene, polypropylene, or copolymers thereof), polyurethanes, polyvinyl acetates, polyvinyl chlorides, polyesters (e.g., polyethylene terephthalate or polyethylene naphthalate), polycarbonates, polyacrylates such as polymethyl (meth)acrylates (PMMA), ethylene-vinyl acetate copolymers, neoprenes, and cellulosic materials (e.g., cellulose acetate, cellulose triacetate, and ethyl cellulose). The substrate can be in the form of foils, films, or sheets, nonwoven materials (e.g., paper, fabric, nonwoven scrims), foams, and the like.

For some substrates, it may be desirable to treat the surface of the substrate to improve adhesion to the pressure-sensitive adhesive layer. Such treatments include, for example, application of primer layers, surface modification layer (e.g., corona treatment or surface abrasion), or both. Illustrative examples of suitable chemical primer layer types include urethanes, silicones, epoxy resins, vinyl acetate resins, ethyleneimines, and the like. Urethane and silicone types are particularly effective chemical primers for use with polyester film substrates. One suitable silicone type of primer layer has a continuous gelled network structure of inorganic particles, and is described in Japanese Unexamined Pat. Publication (Kokai) No. 2-200476. This primer layer has a strong affinity for polyester resins and polyolefin resins. Illustrative examples of chemical primers for vinyl and polyethylene terephthalate films include the crosslinked acrylic ester/acrylic acid copolymers disclosed in U.S. Pat. No. 3,578,622 (Brown).

In some embodiments, the substrate is a release liner. Release liners typically have low affinity for the pressure-sensitive adhesive layer. Exemplary release liners can be prepared from paper (e.g., Kraft paper) or other types of polymeric material. Some release liners are coated with an outer layer of a release agent such as a silicone-containing material or a fluorocarbon-containing material.

Some articles are adhesive tapes. The adhesive tapes can be single-sided adhesive tapes with the pressure-sensitive adhesive on a single side of the backing layer or can be double-sided adhesive tape with a pressure-sensitive adhesive layer on both major surfaces of the backing layer. The backing layer is often a polymeric film, fabric, or foam. Each pressure-sensitive adhesive layer may be positioned, if desired, between the backing layer and a release layer.

Any suitable backing layer can be used. In some embodiments, the backing layer is an oriented polyolefin film. For example, the oriented polyolefin film can prepared as described in U.S. Pat. No. 6,638,637 (Hager et al.). Such backings layers often include multiple layers of polyolefins with at least two different melting points and that are biaxially oriented. In another example, the oriented polyolefin film can be prepared as described in U.S. Pat. No. 6,451,425 (Kozulla et al.). Such backings often include an isotactic polypropylene that is blended or mixed with at least one second polyolefin such as polyethylene, polybutylene, or syndiotactic polypropylene. These backings are typically biaxially oriented.

For adhesive tapes with a single pressure-sensitive adhesive layer, the backing layer often has a first surface that has been treated (i.e., primed) to improve adhesion to the pressure-sensitive adhesive layer. The backing layer has a second surface opposite the first surface that has a low adhesion to the pressure-sensitive adhesive layer. Such an adhesive tape can be formed into a roll. In some embodiments, the adhesive tapes are packaging tapes.

Other articles are transfer tapes in which a pressure-sensitive adhesive layer is positioned adjacent to a release liner. The transfer tape can be used to transfer the pressure-sensitive adhesive layer to another substrate or surface. Any suitable release liner can be used. In many embodiments, the release liner has a release layer coating adjacent to a substrate. Suitable substrates include, but are not limited to, paper such as poly-coated Kraft paper and super-calendered or glassine Kraft paper; cloth (fabric); nonwoven web; metal or metal alloy including metal foil; polyesters such as poly(alkylene terephthalate) such as poly(ethylene terephthalate), poly(alkylene naphthalate) such as poly(ethylene naphthalate); polycarbonate; polyolefins such as polypropylene, polyethylene, polybutylene, and copolymers thereof; polyamide; cellulosic materials such as cellulose acetate or ethyl cellulose; and combinations thereof.

In some exemplary embodiments, the release liners have a release coating containing a polymerized product of a vinyl-silicone copolymers as described in U.S. Pat. No. 5,032,460 (Kantner et al.). In other exemplary embodiments, the release liner has a release coating containing a polymerized product of a (meth)acrylate-functionalized siloxane as described in U.S. Patent Application Publication No. 2013/059105 (Wright et al.). Such release coatings can be prepared by applying a coating of a polymerizable composition containing the (meth)acrylate-functionalized polysiloxane to a surface of a substrate and then irradiating the coating with ultraviolet radiation. The ultraviolet radiation is often provided by short wavelength polychromatic ultraviolet light source having at least one peak with intensity at a wavelength in the range of about 160 to about 240 nanometers. Suitable short wavelength polychromatic ultraviolet light sources include, for example, low pressure mercury vapor lamps, low pressure mercury amalgam lamps, pulsed Xenon lamps, and glow discharge from a polychromic plasma emission source. The coatings applied to the substrate can be free or substantially free (e.g., less than 0.1 weight percent, less than 0.01 weight percent, or less than 0.001 weight percent) of a photoinitiator based on the total weight of the coatings.

The pressure-sensitive adhesive layers often have both high peel adhesion (i.e., peel strength) and high shear strength (i.e., cohesion) to both smooth and rough surfaces. As such, the pressure-sensitive adhesives can be used in articles having a diverse range of uses and can be adhered to a variety of substrates. In some embodiments, the substrate is a polymeric film or sheet, metal or metal alloy, fabric, or foam.

In embodiments where no tackifier or low amounts of tackifier are used, the pressure-sensitive adhesives are well suited for applications where low volatile organic content is needed such as for automotive interior applications. The pressure-sensitive adhesives often have both high peel adhesion and high shear strength (i.e., cohesion), particularly when adhered to low surface energy substrates such as polyolefin (e.g., polypropylene, polyethylene, polybutylene, and copolymers thereof) and clear coats. The good adhesive characteristics (e.g., high peel adhesion and high shear strength) can typically be maintained even at temperatures above room temperature such as those near 70° C.

In embodiments where a tackifier is included, the pressure-sensitive adhesives often have both high peel adhesion and high shear strength, particularly when adhered to polar surfaces such as metals or metal alloys (e.g., carbon steel and stainless steel).

Embodiment 1 is an emulsion composition that contains a) water, b) a polymerizable surfactant having an unsaturated group that can undergo free radical polymerization, c) a first monomer composition, and d) a second (meth)acrylate polymer. The first monomer composition includes an alkyl (meth)acrylate having a linear or branched alkyl group with at least six carbon atoms. The second (meth)acrylate polymer is present in an amount of 0.5 to 15 weight percent based on a total weight of monomers in the first monomer composition and has a glass transition temperature greater than or equal to 50° C. The second (meth)acrylate polymer is formed from a second monomer composition containing at least 50 weight percent of a cyclic alkyl (meth)acrylate based on a total weight of monomers in the second monomer composition, wherein the cyclic alkyl group has at least six carbon atoms. The emulsion composition contains a first phase that includes the water and a second phase dispersed as droplets within the first phase. The droplets contain a mixture of i) at least 90 weight percent of the first monomer composition and ii) the second (meth)acrylate polymer. The second (meth)acrylate polymer is not miscible with the first phase and is dissolved in the first monomer composition within the droplets.

Embodiment 2 is the emulsion composition of embodiment 1, wherein the cyclic alkyl (meth)acrylate in the second monomer composition has a glass transition temperature equal to at least 80° C. when measured as a homopolymer.

Embodiment 3 is the emulsion composition of embodiment 1 or 2, wherein the first monomer composition further comprises a cyclic alkyl (meth)acrylate, polar monomer, or both.

Embodiment 4 is the emulsion composition of any one of embodiments 1 to 3, wherein the first monomer composition comprises 60 to 98 weight percent of the alkyl (meth)acrylate having a linear or branched alkyl group with at least six carbon atoms, 1 to 30 weight percent of a cyclic alkyl (meth)acrylate, and 1 to 10 weight percent of the polar monomer based on a total weight of monomers in the first monomer composition.

Embodiment 5 is the emulsion composition of any one of embodiments 1 to 4, wherein the second monomer composition comprises 50 to 100 weight percent of a cyclic alkyl (meth)acrylate and 0 to 50 weight percent of an optional monomer that is a polar monomer, an alkyl (meth)acrylate having a linear or branched alkyl group, a vinyl monomer that does not have a (meth)acryloyl group, (meth)acrylamide, (meth)acrylonitrile, N-alkyl (meth)acrylamide, N,N-dialkyl (meth)acrylamide, or a mixture thereof based on a total weight of monomers in the second monomer composition.

Embodiment 6 is the emulsion composition of any one of claims 1 to 5, wherein the second monomer composition comprises 90 to 99 weight percent of the cyclic alkyl (meth)acrylate and 1 to 10 percent polar monomer or 90 to 100 weight percent of the cyclic alkyl (meth)acrylate and 0 to 10 weight percent polar monomer based on a total weight of monomers in the second monomer mixture.

Embodiment 7 is the emulsion composition of any one of embodiments 1 to 6, wherein the first monomer composition is different than the second monomer composition.

Embodiment 8 is the emulsion composition of any one of embodiments 1 to 7, wherein the second (meth)acrylate polymer has a weight average molecular weight in a range of 3,000 to 150,000 grams/mole.

Embodiment 9 is the emulsion composition of any one of embodiments 1 to 8, wherein the emulsion composition does not contain a tackifier.

Embodiment 10 is the emulsion composition of any one of embodiments 1 to 9, wherein the emulsion composition contains at least 25 weight percent water based on a total weight of the emulsion composition.

Embodiment 11 is the emulsion composition of any one of embodiments 1 to 10, wherein the emulsion composition contains up to 90 weight percent water based on the total weight of the emulsion composition.

Embodiment 12 is the emulsion composition of any one of embodiments 1 to 11, wherein the polymerizable surfactant is a propenyl polyoxyethylene alkylphenyl compound or propenyl polyoxyethylene alkylphenyl ether ammonium sulfate compound.

Embodiment 13 is the emulsion composition of any one of embodiments 1 to 12, wherein the polymerizable surfactant is sodium dodecylallyl sulfosuccinate or a phosphate ester.

Embodiment 14 is the emulsion composition of any one of embodiments 1 to 13, wherein the emulsion composition contains at least 0.5 weight percent polymerizable surfactant based on the total weight of monomers in the first monomer composition.

Embodiment 15 is the emulsion composition of any one of embodiments 1 to 14, wherein the emulsion composition contains up to 2 weight percent polymerizable surfactant based on the total weight of monomers in the first monomers composition.

Embodiment 16 is a latex composition comprising a polymerized product of the emulsion composition of any one of embodiments 1 to 15, wherein the latex composition comprises polymeric latex particles.

Embodiment 17 is the latex composition of embodiment 16, wherein the polymeric latex particles have a single glass transition temperature as determined using a Differential Scanning Calorimeter.

Embodiment 18 is the latex composition of embodiment 16 or 17, wherein the second (meth)acrylate polymer and a polymerized product of the first monomer composition are together in the same polymeric particles.

Embodiment 19 is the latex composition of any one of embodiments 16 to 18, further comprising a tackifier that is water dispersible.

Embodiment 20 is the latex composition of any one of embodiments 16 to 19, wherein the polymerized product of the emulsion composition comprises polymerized surfactant in an amount in a range of 1 to 2 weight percent based on a total weight of the polymeric latex particles.

Embodiment 21 is a pressure-sensitive adhesive comprising a dried product of the latex composition of any one of embodiments 16 to 20.

Embodiment 22 is an article comprising (a) a substrate and (b) a first pressure-sensitive adhesive layer positioned adjacent to a first major surface of the substrate, wherein the first pressure-sensitive adhesive layer comprises the pressure-sensitive adhesive of embodiment 21.

Embodiment 23 is the article of embodiment 22, further comprising a second layer of pressure-sensitive adhesive of embodiment 21 positioned adjacent to a second major surface of the substrate.

Embodiment 24 is the article of embodiment 22 or 23, wherein the substrate is a foam or polymeric film.

Embodiment 25 is the article of any one of embodiments 22 to 24, wherein the substrate is a biaxially oriented polyolefin film.

Embodiment 26 is the article of any one of embodiments 22 to 24, wherein the substrate is a release liner.

Embodiment 27 is the article of embodiment 26, wherein the release liner comprises a release coating comprising a polymerized product of a vinyl-silicone copolymer or a (meth)acrylate-functionalized siloxane.

Embodiment 28 is the article of embodiment 26 or 27, wherein the article is a transfer tape.

Embodiment 29 is the article of embodiment 22 to 25, wherein the article is an adhesive tape.

Embodiment 30 is the article of embodiment 29, wherein the adhesive tape is a packaging tape.

Embodiment 31 is the article of any one of embodiments 22 to 25, wherein the substrate has a low energy surface.

Embodiment 32 is the article of embodiment 31, wherein the low energy surface comprises a polyolefin or a clear coat.

Embodiment 33 is a method of forming a pressure-sensitive adhesive. The method includes (a) forming an emulsion composition of any one of embodiments 1 to 15, (b) polymerizing the emulsion composition to form a latex composition comprising polymeric latex particles, and (c) drying the latex composition to form the pressure-sensitive adhesive.

Embodiment 34 is the method of embodiment 33, wherein forming the emulsion composition comprises forming the second (meth)acrylate polymer, dissolving the second (meth)acrylate polymer in one or more monomers in the first monomer composition to form a polymer solution, adding the polymer solution to the first phase, and forming droplets of the polymer solution within the first phase by mixing with high shear.

EXAMPLES

All parts, percentages, ratios, etc. used in the Examples are by weight unless indicated otherwise.

As used herein, the term "pph" refers to parts per hundred.

TABLE 1

Materials

| Abbreviation | Description | Supplier |
|---|---|---|
| EHA | 2-Ethylhexyl acrylate | Dow Chemical (Midland, MI, USA) |
| IBOA | Isobornyl acrylate | San Esters (New York, NY, USA) |
| IBOMA | Isobornyl methacrylate | Sigma Aldrich (St. Louis, MO, USA) |
| IOA | Isooctyl acrylate | 3M Company (St. Paul, MN, USA) |
| AA | Acrylic acid (99%) | Alfa Aesar (Ward Hill, MA, USA) |
| MAA | Methacrylic acid (99%) | Alfa Aesar (Ward Hill, MA, USA) |
| EtOAc | Ethyl acetate | Sigma Aldrich (St. Louis, MO, USA) |
| MEHQ | Methoxyether hydroquinone | Sigma Aldrich (St. Louis, MO, USA) |
| IOTG | Isooctyl thioglycolate | Sigma Aldrich (St. Louis, MO, USA) |
| IRGACURE 651 | 2,2-Dimethoxy-1,2-diphenyl-ethanone | BASF (Ludwigshafen, Germany) |
| IRGANOX 1010 | Pentaerythritol tetrakis (3-(3,5-di-tert-butyl-4-hydroxyphenyl) propionate) | BASF (Ludwigshafen, Germany) |
| LUPERSOL 101 | 2,5-Dimethyl-2,5-di(t-butylperoxy)hexene | Atofina (Philadelphia, PA, USA) |
| LUPERSOL | 2,5-Dimethyl-2,5-di(t- | Atofina (Philadelphia, PA, USA) |

TABLE 1-continued

Materials

| Abbreviation | Description | Supplier |
|---|---|---|
| 130 | butylperoxy)hexyne-3 | |
| VAZO 52 | 2,2'-Azobis(2,4-dimethylpentanenitrile) | DuPont (Wilmington, DE, USA) |
| VAZO 67 | 2,2'-Azobis(2-methylbutanenitrile) | DuPont (Wilmington, DE, USA) |
| VAZO 88 | 1,1'-Azobis(cyclohexanecarbonitrile) | DuPont (Wilmington, DE, USA) |
| KPS | Potassium persulfate (99.9% purity) | Alfa Aesar (Ward Hill, MA, USA) |
| $Na_2S_2O_5$ | Sodium bisulfate (97% purity) | Alfa Aesar (Ward Hill, MA, USA) |
| $FeSO_4 \cdot 7H_2O$ | Ferrous sulfate heptahydrate | Sigma Aldrich (St. Louis, MO, USA) |
| DIANAL BR113 | Described by vendor as a methyl methacrylate resin; the $M_w$ was about 30 kg/mol | Dianal America, Inc. (Pasadena, TX, USA) |
| DIANAL MB2543 | Described by vendor as a butyl methacrylate resin with a molecular weight of about 35 kg/mole | Dianal America, Inc. (Pasadena, TX, USA) |
| TRITON X-100 | Nonionic surfactant | Dow Chemical (Midland, MI, USA) |
| DS-4 | Sodium dodecyl benzene sulfonate surfactant | Rhodia Inc., which is a member of the Solvay Group (Cranbury, NJ, USA) |
| DS-10 | Sodium dodecyl benzene sulfonate surfactant | Rhodia Inc., which is a member of the Solvay Group (Cranbury, NJ, USA) |
| HITENOL BC-1025 | Polyoxyethylene alkylphenyl propenyl ether ammonium sulfate (25 wt. % solids solution in water), which is a polymerizable surfactant | Dai-Ichi Kogyo Seiyaku Co., Ltd. (Japan) |
| SNOWTACK SE780G | Water-dispersed tackifier, polymeric material based on rosin adduction and esterification | Lawter Inc. (Chicago, IL, USA) |
| TEGO RC-902 | Silicone acrylate with a high silicone to acrylate ratio | Evonik North America, Inc. (Parsippany, NJ, USA) |
| TEGO RC-711 | Silicone acrylate with a low silicone to acrylate ratio | Evonik North America, Inc. (Parsippany, NJ, USA) |
| PARAGUM 500 | Polyacrylate thickener | Royal Coatings & Specialty Polymers (South Bend, IN, USA) |

Test Method 1: Polymer Molecular Weight Measurement

The molecular weight distribution of the compounds was characterized using gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micrometer PLgel MIXED-D columns available from Varian Inc. (Palo Alto, Calif., USA).

Samples of polymeric solutions were prepared by dissolving dried polymer samples in tetrahydrofuran at a concentration of 0.5 percent (weight/volume) and filtering through a 0.2 micrometer polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares analysis to establish a standard calibration curve. The weight average molecular weight ($M_w$) and the polydispersity index (weight average molecular weight divided by number average molecular weight ($M_n$)) were calculated for each sample against this standard calibration curve.

Test Method 2: Viscosity

The viscosity was measured with a Brookfield viscometer with spindle 3 (obtained from Brookfield Engineering (Middleboro, Mass., USA)) at a rotating speed of 30 revolutions per minute (rpm).

Test Method 3: Latex Weight Percent (Wt. %) Solids

To measure solid content, first an aluminum dish was weighed, then about 0.2 to 0.3 grams of latex was added in the dish. The latex was diluted by adding about 0.5 grams distilled deionized water. The dish was heated in an 80° C. oven for about 4 hours until the weight did not change any more. The weight percent solids (wt. % solids) was calculated according to the following equation:

$$\text{Wt. \% solids} = 100 \times (W2 - W1)/(W3 - W1)$$

In this equation, W2 is the weight of the dish plus the weight of the dried polymer latex, W1 is the weight of the dish, and W3 is the weight of the dish plus the weight of the wet polymer latex.

Test Method 4: Latex pH

The latex pH was measured with a pH meter (from Chemtrix, Rolling Hills Estates, CA, USA under the trade designation "MODEL 60A pH METER").

Test Method 5: Glass Transition of Polymer ($T_g$) by Differential Scanning Calorimetry (DSC)

Polymer samples were dried to remove water and/or organic solvent. The dried samples were then weighed and loaded into TA Instruments $T_{zero}$ aluminum hermetic DSC sample pans. The samples were analyzed using a TA Instruments Q2000 MODULATED DIFFERENTIAL SCANNING CALORIMETER ("Q2000 MDSC", including RC-03761 sample cell), utilizing a heat-cool-heat method in temperature-modulated mode (−90° C. to 125° C. at 5° C./min. with a modulation amplitude of ±0.796° C. and a period of 60 seconds) under a nitrogen atmosphere. TA Instruments is located in New Castle, Del., USA.

In temperature modulated mode, the Q2000 MDSC gave three signals: cumulative (standard) heat flow, reversing (Rev) heat flow, and nonreversing (Nonrev) heat flow. The cumulative heat flow signal was the sum of the reversing and nonreversing heat flow signals. The reversing signal was the heat capacity (Cp) component, which exhibited changes in heat capacity and included transitions such as the $T_g$ (glass transition). The nonreversing signal was the kinetic component and included kinetic transitions such as crystallization and chemical reactions.

Following data collection, the thermal transitions were analyzed using the TA UNIVERSAL ANALYSIS program. If present, any glass transitions ($T_g$) or significant endothermic or exothermic peaks were evaluated. The glass transition temperatures were evaluated using the step change in the standard heat flow (HF) or reversing heat flow (Cp related/REV HF) curves. The onset, midpoint (half height), and end temperatures of the transition were noted as well as the change in heat capacity observed at the glass transition were calculated. Any peak transitions were evaluated using the heat flow (HF), reversing heat flow (Rev HF) or non-reversing heat flow (Nonrev HF) curves. Peak area values and/or peak minimum/maximum temperatures were also determined. The peak integration results were normalized for sample weight and reported in J/g.

Test Method 6: Particle Size Via Dynamic Light Scattering

For a polymer dispersion (or latex) with average particle size smaller than 1 micrometer, the average particle size of latex samples was measured with dynamic light scattering instrument (ZETASIZER NANO ZS, available from Malvern Instruments Ltd. (Worcestershire, UK)) with diluted latex sample (approximately one drop of latex in 5 mL of water), following the manufacturer's instructions, and using polystyrene bead calibration standards.

Test Method 7: Particle Size Via Laser Diffraction

For a polymer dispersion (or latex) with average particle size larger than 1 micrometer, the average particle size was measured by laser diffraction with an HORIBA LA-950 LASER DIFFRACTION PARTICLE SIZE ANALYZER (Horiba Instruments, Inc., Kyoto, Japan) with a diluted latex sample (approximately 1:5 weight ratio of polymer dispersion to 1% DS-10 surfactant solution in deionized water), following the manufacturer's instructions.

Test Method 8: 90 Degree Peel Adhesion Test to Polypropylene Substrate

A sample of pressure-sensitive adhesive to be tested was coated with a hand-spread knife onto a 2.0 mil (0.002 inches, approximately 51 micrometer) polyester film (HOSTAPHAN 3 SAB, primed PET film, available from Mitsubishi Polyester Film Inc. (Greer, S.C., USA)), and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for about 24 hours, and then cut into strips of tape that were 0.5 inch (approximately 1.3 cm) wide.

Polypropylene (PP) test panels (5 cm×12.5 cm panels obtained from Aeromat Plastics (Burnsville, Minn., USA) were prepared by wiping the panels 8 to 10 times using hand pressure with a tissue wetted with the isopropyl alcohol. The procedure was repeated two more times with clean tissues wetted with isopropyl alcohol. The cleaned panels were air dried.

To do the PP peel adhesion test, first the 0.5 inch (1.25 cm) wide strip of tape was applied to the PP substrate with a 2 kilograms (4.5 pounds) roller. Then the peel test was performed at a removal angle of 90 degrees according to the procedure described in the ASTM International standard D3330/D3330M-04 (reproved in 2010), Method F.

Peel adhesion was assessed with an IMASS SP-2000 slip/peel tester (available from IMASS, Inc., Accord, Mass., USA) at a peel rate of 305 mm/minute (12 inches/minute). Peel adhesion values were reported as both ounces per inch (oz/in) and Newtons per decimeter (N/dm).

Test Method 9: 180 Degree Peel Adhesion Test to Stainless Steel Substrate

A sample of pressure-sensitive adhesive to be tested was coated with a hand-spread knife onto a 2.0 mil (0.002 inches, approximately 51 micrometer) polyester film (HOSTAPHAN 3 SAB, primed PET film, available from Mitsubishi Polyester Film Inc. (Greer, S.C., USA)), and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for 24 hours, and then cut into strips of tape that were 0.5 inch (approximately 1.3 cm) wide.

The 0.5 inch (approximately 1.3 cm) wide strips of tape were applied to a stainless steel (SS) plate with a 2 kg (4.5 pound) roller and then peel adhesion was assessed with an IMASS SP-2000 slip/peel tester (available from IMASS, Inc. (Accord, Mass., USA)) using a peel angle of 180 degrees and speed of 12 inches (approximately 30 cm) per minute. Peel adhesion values were reported as both ounces per inch (oz/in) and Newtons per decimeter (N/dm).

Test Method 10: Static Shear Strength at 70° C.

A sample of pressure-sensitive adhesive to be tested was coated with a hand-spread knife onto a 2.0 mil (0.002 inches, approximately 51 micrometer) polyester film (HOSTAPHAN 3 SAB, primed PET film, available from Mitsubishi Polyester Film Inc. (Greer, S.C., USA)), and dried in a 70° C. oven for 15 minutes to give a dry PSA thickness in a range of 0.9 to 1.2 mil (approximately 23 to 30 micrometers). The coated film was conditioned at 23° C. and 50 percent relative humidity for 24 hours, and then cut into strips of tape 0.5 inch (approximately 1.3 cm) wide.

The static shear strength of an adhesive was determined according to ASTM International standard, D3654/D3654M-06 (reapproved in 2011)—Procedure A, using a 500 grams load inside an oven set at 70° C. A test specimen was prepared by laminating a 0.5 in. x 1 in. (1.3 cm×2.5 cm) piece of adhesive or tape on a polypropylene (PP) or stainless steel (SS) panel. The time to failure, i.e., time in minutes for the weight to pull the adhesive away from panel was recorded. If no failure was observed after 10,000 minutes, the test was stopped and a value of 10,000+ minutes was recorded.

Testing Method 11: Fabric Bonding Adhesion Test

The fabric, which was a sport nylon (obtained from Joann Fabrics as item number 1997147, royal blue color) was cut into 1 inch (about 2.5 cm) wide and 6 inch (15.2 cm) long strips. The adhesive tape was cut into 0.5 inch (1.3 cm) wide and 7-8 inches (18 to 20 cm) long strips. The tape strip was laid on the fabric strip. This testing sample was laminated together with a 2 kg (4.5 pound) roller, and then dwelled for 1 hour before testing. The end of fabric was then placed in the bottom jaw of an Instron device and the end of tape in the top jaw. The Instron settings were set as follows: crosshead speed of 12 inch/min (30.5 cm/min), and average load was taken between 2 inch (5.1 cm) and 5 inch (12.7 cm), which part was the middle portion of the sample. Three readings were recorded, averaged and reported as the peel adhesion.

Preparatory Example 1 (PE-1)

A polymer was made with two steps. In the first step of the polymerization, the reactor (an agitated stainless steel reactor) was charged with a mixture consisting of 88 kg of IBOA and 2.72 kg of acrylic acid (AA), along with 90.8 grams of IRGANOX 1010, 381 grams of IOTG, 18.2 grams of MEHQ, and 1.8 grams of VAZO 52. The reactor was sealed and purged of oxygen and then held at approximately 5 psig (34.5 kPa) nitrogen pressure. The reaction mixture was heated to 60° C. (140° F.) and the reaction proceeded adiabatically and peaked at a temperature of 127° C. (260° F.). When the reaction was complete, the mixture was cooled to below 50° C.

In the second step, to the reaction product of the first step was added 10.9 grams of VAZO 52, 3.6 grams of VAZO 67, 5.4 grams of VAZO 88, 5.4 grams of LUPERSOL 101, and 7.3 grams of LUPERSOL 130 (the initiator components were added as a solution dissolved in a small amount of ethyl acetate). An additional 191 grams of IOTG was then added. The reactor was sealed and purged with nitrogen and held at 5 psig (34.5 kPa) nitrogen pressure. The reaction mixture was heated to 60° C. (140° F.) and the reaction proceeded adiabatically. After the reaction reached peak temperature of 176° C. (350° F.), the mixture was heated at this temperature for 2 hours. The resulting polymeric material is referred to as PE-1. To get PE-1 out of the reactor, the heating jacket was drained and EHA is added over a period of 2 hours. The resulting polymer solution, which contained PE-1 dissolved in the added EHA, was then cooled to 93° C. (200° F.) and stirred overnight.

As used herein, the term "PE-1" refers to the polymeric material formed from IBOA/AA (97/3) and having a weight average molecular weight of 35 kg/mole. All formulations below using PE-1 are based on the weight of the polymer rather than on the weight of the polymer solution formed by dissolving PE-1 in EHA. The EHA added to form the polymer solution is considered to be part of the first monomer composition.

Preparatory Example 2 (PE-2)

The polymerization was carried out by a two step reaction using a VSP2 adiabatic reaction apparatus equipped with a 316 stainless steel test can (available from Fauske and Associates Inc., Burr Ridge, Ill., USA).

In the first step of the polymerization, the test can in the VSP2 reactor was charged with 80 grams of a monomer mixture (IBOA/AA: 97/3 weight ratio). To the monomer mixture was added 0.1 pph of IRGANOX 1010, 2 pph of chain transfer agent (IOTG), 0.02 pph of MEHQ, and 0.002 pph of VAZO 52 with each pph based on the total weight of monomers in the monomer mixture. The reactor was sealed and purged with nitrogen and then held at approximately 100 psig (689 kPa) nitrogen pressure. The reaction mixture was heated to 60° C. and the reaction proceeded adiabatically. The approximate peak temperature was about 180° C. After the temperature peaked, the mixture was cooled to below 50° C.

In a second step, an initiator solution was added to 75 grams of the reaction product of the first step. The solution contained 0.012 pph of VAZO 52, 0.004 pph of VAZO 67, 0.006 pph of VAZO 88, 0.006 pph of LUPERSOL 101, and 0.008 pph of LUPERSOL 130 with each pph based on the weight of the polymeric material in the reaction product. The initiators were dissolved in a small amount of ethyl acetate and the total initiator solution weighed 0.7 grams. An additional amount of IOTG (1 pph) was then added. The reactor was sealed, purged of oxygen, and held at 100 psig (793 kPa) nitrogen pressure. The reaction mixture was heated to 60° C. and the reaction proceeded adiabatically, with a peak temperature of about 124° C. The reaction mixture was warmed to 170° C. and held at that temperature for 1 hour. The polymer was then cooled. The resulting polymer had a composition of IBOA/AA of 97/3 and $M_w$ of 8 kg/mol.

Preparatory Example 3 (PE-3)

The formulation and procedure was the same as PE-2 except the amount of chain transfer agent and the reaction peak temperatures were altered. In step 1, 1.1 pph of IOTG was added and the peak temperature was about 134° C. In step 2, 0.55 pph of IOTG was added and the peak temperature was about 138° C. The resulting polymer had a composition of IOBA/AA of 97/3 and $M_w$ of 14 kg/mol.

Preparatory Example 4 (PE-4)

The formulation and procedure was the same as PE-2 except the amount of chain transfer agent and the reaction peak temperatures were altered. In step 1, 0.6 ppph of IOTG was added and the peak temperature was about 130° C. In step 2, 0.3 pph of IOTG was added and the peak temperature was about 133° C. The resulting polymer had a composition of IOBA/AA of 97/3 and $M_w$ of 23 kg/mol.

Preparatory Example 5 (PE-5)

150 grams ethyl acetate, 37.50 grams IBOA, 11 grams IBOMA, 1.50 grams AA, 0.25 grams VAZO 67, and 0.125 grams IOTG were charged into a bottle. Then the reactants were purged with nitrogen to remove the oxygen. The bottle was then sealed and put in a launderometer to react at 60° C. for 24 hours. Then the polymer solution was placed in an aluminum dish and dried in an oven to remove the solvent. The dried polymer had a composition of IBOA/IBOMA/AA of 75/22/3 and $M_w$ of about 34 kg/mol.

Preparatory Example 6 (PE-6)

A polymer was prepared by a bulk polymerization within a polymeric pouch initiated by ultra-violet radiation according to the method described in Patent Application Publication No. WO 96/07522 and U.S. Pat. No. 5,804,610 (Hamer et al.). The polymer was made with the formulation of IOA (84.3 pph), IBOA (12.7 pph), AA (3 pph), IOTG (0.03 pph) and IRGACURE 651 (0.15 pph). Each pph was based on the total weight of all the monomers. The polymer had composition of IOA/IBOA/AA (84.3/12.7/3) and Mw of about 625 kg/mol.

Preparatory Example 7 (PE-7)

A polymer was prepared by a bulk polymerization within a polymeric pouch initiated by ultra-violet radiation according to the method described in Patent Application Publication No. WO 96/07522 and U.S. Pat. No. 5,804,610 (Hamer et al.). The polymer was made with the formulation of IOA (97 pph), AA (3 pph), IOTG (0.03 pph) and IRGACURE 651 (0.15 pph). Each pph was based on the total weight of all the monomers. The polymer had composition of IOA/AA (97/3) and Mw of about 576 kg/mol.

Preparatory Example 8 (PE-8)

DS-10 (3.80 grams) along with 225 grams of deionized water were added into a beaker and stirred to form an aqueous solution. AA (9.5 grams), $CBr_4$ (0.18 grams), and IBOA (180.5 grams) were added to a separate beaker and mixed well to form an oil phase. The aqueous and oil phases were then both poured into a 2-liter resin flask equipped with a thermometer, mechanical agitator with glass retreat blade impeller, condenser, and nitrogen inlet tube. The reaction mixture was then stirred at 300 revolutions per minute (rpm) under a blanket of nitrogen. The reactants were heated to 29° C., and then KPS (0.38 grams), $Na_2S_2O_5$ (0.10 grams), and a solution of $FeSO_4.7H_2O$ (0.0011 grams dissolved in 0.5 grams $H_2O$) were added. The reaction resulted in an exotherm peak temperature of 48° C. After the exotherm peak was reached, the reactants were heated to 75° C. and maintained at that temperature for 1.5 hours. The latex was then cooled and filtered through cheese cloth to yield a latex having 39 weight percent solids, pH about 4.6, viscosity about 2,000 centipoises, and average particle diameter of about 126 nanometers. This latex polymer had a composition of IBOA/AA (97/3) and $M_w$ of 162 kg/mol.

Preparatory Example 9 (PE-9)

First, an IBOA/AA (97/3) copolymer with $M_w$ of about 34,000 g/mol was prepared by a bulk polymerization within a polymeric pouch initiated by ultra-violet radiation according to the method described in in Patent Application Publication No. WO 96/07522 and U.S. Pat. No. 5,804,610 (Hamer et al.). The polymer was made with the formulation of IBOA (97 pph), AA (3 pph), IRGACURE 651 (1 pph), and IOTG (0.75 pph) where each pph is based on the total weight of monomers.

Then 50 grams of the resulting polymer, 50 grams of toluene, 0.64 grams TRITON X-100, 0.115 grams DS-4 were mixed together to form an oil phase. The aqueous phase was prepared by mixing together 25 grams water and 0.115 grams DS-4. The aqueous phase solution and then the oil phase solution were added to a 1 L stainless steel Waring blender. The mixture was blended at the high speed setting for 2 minutes to give a polymer emulsion having about 40 weight percent solids, a viscosity of 3960 centipoises, and an average particle diameter of about 2.9 micrometers.

TABLE 2

Summary of Preparatory Examples (PE-1 to PE-9) and DIANAL Polymers

| Sample | Composition | $M_w$ (kg/mol) | $T_g$ (° C.) |
|---|---|---|---|
| PE-1 | IBOA/AA (97/3) | 35 | 95 |
| PE-2 | IOBA/AA (97/3) | 8 | 74 |
| PE-3 | IBOA/AA (97/3) | 14 | 85 |
| PE-4 | IBOA/AA (97/3) | 23 | 93 |
| PE-5 | IBOA/IBO/MA/AA (75/22/3) | 34 | 83 |
| PE-6 | IOA/IBOA/AA (84.3/12.7/3) | 625 | −50 |
| PE-7 | IOA/AA (97/3) | 576 | −52 |
| PE-8 | IBOA/AA (97/3) | 162 | 95 |
| PE-9 | IBOA/AA (97/3) | 34 | 95 |
| DIANAL BR113 | Described by vendor as a methyl methacrylate resin | 35 | 60 |
| DIANAL MB2543 | Described by vendor as a butyl methacrylate resin | 30 | 88 |

The $T_g$ for PE-6 and PE-9 were calculated using the Fox Equation while the $T_g$ for PE-1 to PE-5, DIANAL BR113, and DIANAL MB2543 were measured using modulated DSC.

Preparatory Example 10 (PE-10): Preparation of a Short-Wave UV-Cured Liner

A blend of 70 weight percent TEGO RC-902 and 30 weight percent TEGO RC-711 was coated onto one side of a 50 micrometer thick unprimed PET film substrate (available from Mitsubishi Polyester Film, Inc. (Greer, S.C., USA)) to give a wet coating thickness of less than 1.0 micrometer. The coated film was then exposed to the output of three 150W low-pressure mercury amalgam lamps (manufactured by Heraeus Noblelight (Hanau, Germany)) with a peak intensity at 185 nm in a nitrogen atmosphere and at a web speed of 15.2 meters per minute (mpm) to provide a short-wave UV-cured liner having a cured release surface. Other information about this liner can be found in U.S. Patent Application Publication No. 2013/0059105 (Wright et al.).

Example 1 (EX-1)

The aqueous phase was prepared by mixing 15.6 grams of HITENOL BC1025 and 208 grams of de-ionized water in a beaker. The oil phase was prepared by mixing 267 grams of 2-ethylhexyl acrylate (EHA), 40.5 grams isobornyl acrylate (IBOA), 5.7 grams of acrylic acid (AA), 3.8 grams of methacrylic acid (MAA), and 9.5 grams of the polymer of Preparatory Example 1 (PE-1) in a beaker until of solution was formed. For further clarification, PE-1 refers to the polymer formed from IBOA/AA (97/3). The amount of EHA included in the polymer solution containing dissolved PE-1 (the amount of EHA added to remove PE-1 from the reactor in which it was prepared) was included in the total amount of EHA added (267 grams). The oil phase had a total weight of 326.5 grams. The oil phase was then poured into the aqueous phase and mixed well. The content was poured into a 1-liter stainless steel Waring blender container and homogenized with the blender at the high speed setting for 2 minutes. The mixture was then poured into a 2-liter resin flask equipped with a thermometer, mechanical agitator with glass retreat blade impeller, condenser, and nitrogen inlet tube. Then, 0.4 grams of potassium persulfate (KPS) was added. The reaction mixture was stirred under a nitrogen blanket and heated to 60° C. and maintained at 60° C. for 4 hours. The temperature was then increased to 80° C. within 30 min and maintained at this temperature for 1 hour. The latex was then cooled and filtered through cheesecloth to give the latex of EX-1. The latex was EHA/IBOA/AA/MMA/PE-1 (84/13/2/1/3). The pH was about 2.8.

FIG. 1 shows the Modulated DSC heat flow signal from the second heating (2H) cycle for the latex polymer of EX-1 as a function of temperature in a nitrogen atmosphere.

Example 2 to Example 5 (EX-2 to EX-5)

These latexes were made the same way (mini-emulsion process) with the same formulation as in EX-1, except PE-2 (for EX-2), PE-3 (for EX-3), PE-4 (for EX-4), and PE-5 (for EX-5) were used in place of PE-1.

Figure 2:
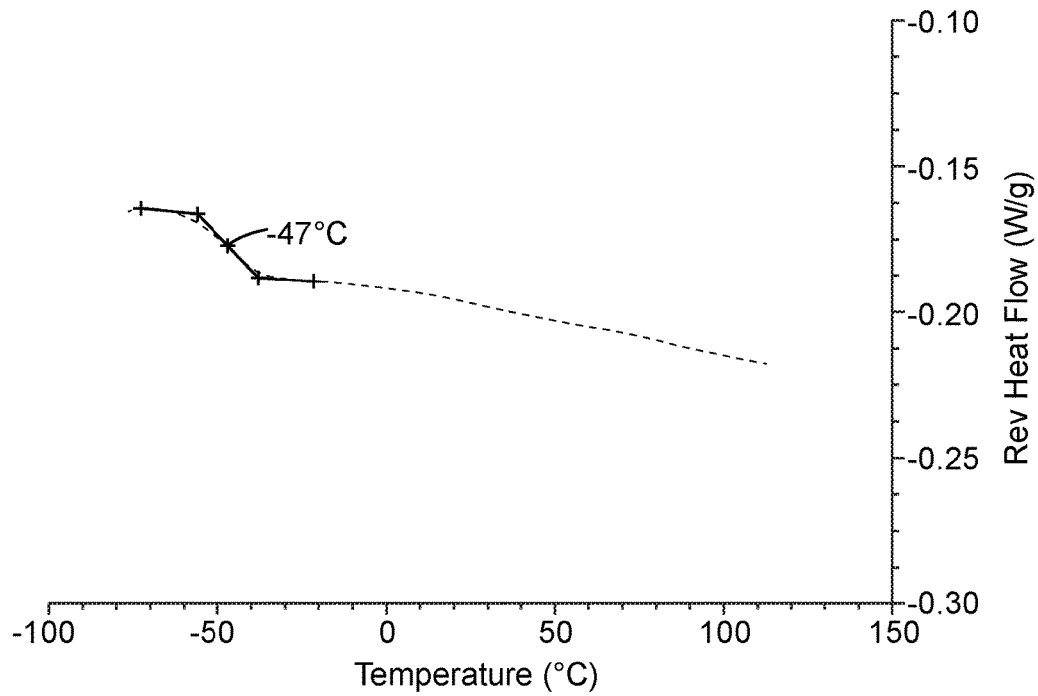
FIG. 2 is the Modulated Differential Scanning Calorimetry plot from the second heating (2H) cycle for the polymeric latex particles of Example 2. Heat flow is plotted as a function of temperature in a nitrogen atmosphere.

FIG. 2 shows the Modulated DSC heat flow signal from the second heating (2H) cycle for the latex particle of EX-2 as a function of temperature in a nitrogen atmosphere.

Comparative Examples 1 and 2 (CE-1 and CE-2)

These two latexes were made the same way (mini-emulsion process) with the same formulation as in EX-1 except that either DIANAL BR113 (for CE-1) or DIANAL MB2543 (for CE-2) was used in place of PE-1. Unlike PE-1, neither DIANAL MB2543 nor DIANAL BR113 was prepared from a monomer having a ring structure. The solid content of CE-1 and CE-2 were both about 60 weight percent. The viscosities were 270 centipoises for CE-1 and 220 centipoises for CE-2. The average particle diameters were about 413 nm for CE-1 and 426 nm for CE-2.

Comparative Example 3 (CE-3)

This latex was made the same way (mini-emulsion process) with the same formulation as in EX-1 except that Preparatory Example 6 (PE-6) was used in place of PE-1. The resulting latex had a solid of 60 weight percent, a viscosity of 92 centipoises, and an average particle diameter of 548 nm.

Comparative Example 4 (CE-4)

This latex was made the same way (mini-emulsion process) with the same formulation as in EX-1 except for that Preparatory Example 7 (PE-7) was used in place of PE-1. After polymerization, ammonia was added in the latex to adjust the latex pH to about 4. The resulting latex had a solids content of 58 weight percent.

Comparative Example 5 (CE-5)

This latex according to the same method as EX-1, except that neither PE-1 nor any other previously formed polymer was added. The reactants coagulated during the polymerization reaction and no latex was obtained.

The $T_g$ for CE-4 was calculated using the Fox Equation while the $T_g$ of EX-1 to EX-5 and CE-1 to CE-3 were measured using modulated DSC. N/A means not analyzed because a latex did not form.

TABLE 4

Adhesive Properties of EX-1 to EX-5 and CE-1 to CE-4

| Example | Peel - SS, oz/in (N/dm) | Peel - PP, oz/in (N/dm) | 70° C. Shear on SS, minutes | 70° C. Shear on PP, minutes |
|---|---|---|---|---|
| EX-1 | 53.4 (58.4) | 24.5 (26.9) | 10000 | 10000 |
| EX-2 | 48.8 (53.4) | 25.5 (27.9) | 10000 | 309 |
| EX-3 | 52.9 (57.9) | 25.5 (27.9) | 10000 | 369 |
| EX-4 | 51.3 (56.2) | 24.58 (26.9) | 10000 | 394 |
| EX-5 | 49.6 (54.3) | 16.7 (18.3) | 10000 | 10000 |
| CE-1 | 46.8 (51.3) | 13.8 (15.1) | 10000 | 171 |
| CE-2 | 44.6 (48.8) | 16.6 (18.2) | 10000 | 151 |
| CE-3 | 44.6 (48.8) | 16.1 (17.6) | 10000 | 159 |
| CE-4 | 25.7 (28.2) | 18.2 (20.0) | 10,000 | 115 |

Comparative Example 6 (CE-6)

30 grams of CE-3 (60 weight percent solids) having a $T_g$ of −50° C. was blended with 1.43 grams of PE-8 (39 wt. % solids) having a $T_g$ of 95° C. The weight ratio of the CE-3 polymer to the PE-8 polymer was 100 to 3 (100:3). The adhesives properties of the blend were measured using Test Methods 8, 9, and 10 and are shown in Table 5.

TABLE 3

Composition of EX-1 to EX-5 and CE-1 to CE-5

| Example | Composition | Solids content, wt. % | Viscosity, cps | Average particle diameter, nm | Approximate $T_g$, ° C. |
|---|---|---|---|---|---|
| EX-1 | EHA/IBOA/AA/MMA/PE-1 (84/13/2/1/3) | 62 | 390 | 392 | −48 |
| EX-2 | EHA/IBOA/AA/MMA/PE-2 (84/13/2/1/3) | 62 | 612 | 385 | −47 |
| EX-3 | EHA/IBOA/AA/MMA/PE-3 (84/13/2/1/3) | 60 | 440 | 437 | −47 |
| EX-4 | EHA/IBOA/AA/MMA/PE-4 (84/13/2/1/3) | 63 | 936 | 447 | −47 |
| EX-5 | EHA/IBOA/AA/MMA/PE-5 (84/13/2/1/3) | 59 | 136 | 400 | −47 |
| CE-1 | EHA/IBOA/AA/MMA/ DIANAL MB2543 (84/13/2/1/3) | 60 | 270 | 413 | −50 |
| CE-2 | EHA/IBOA/AA/MMA/ DIANAL BR113 (84/13/2/1/3) | 60 | 220 | 420 | −50 |
| CE-3 | EHA/IBOA/AA/MMA/PE-6 (84/13/2/1/3) | 60 | 92 | 548 | −50 |
| CE-4 | EHA/IBOA/AA/MMA/PE-7 (84/13/2/1/3) | 58 | 110 | 508 | −50 |
| CE-5 | EHA/IBOA/AA/MMA (87/13/2/1) | N/A | N/A | N/A | N/A |

Comparative Example 7 (CE-7)

30 grams of CE-4 (58 weight percent solids) having a $T_g$ of −50° C. was blended with 1.3 grams of PE-9 (40 wt. % solids) having a $T_g$ of 95° C. The weight ratio of the CE-4 polymer to the PE-9 polymer was 100 to 3 (100:3). The adhesive properties of the blend were measured using Test Methods 8, 9, and 10 and are shown in Table 5.

TABLE 5

Comparison of Adhesive Properties for CE-3, CE-4, CE-6, CE-7, and EX-1

| Sample | Composition | Peel - SS, oz/in (N/dm) | Peel - PP, oz/in (N/dm) | 70° C. Shear on SS, minutes | 70° C. Shear on PP, minutes |
|---|---|---|---|---|---|
| CE-3 | EHA/IBOA/AA/MMA/PE-6 (84/13/2/1/3) | 44.6 (48.8) | 16.1 (17.6) | 10000 | 159 |
|  | where PE-6 has a $T_g$ of −50° C. |  |  |  |  |
| CE-4 | EHA/IBOA/AA/MMA/PE-7 (84/13/2/1/3) | 25.7 (28.2) | 18.2 (20.0) | 10000 | 115 |
|  | where PE-7 has a $T_g$ of −52° C. |  |  |  |  |
| CE-6 | 100:3 blend of CE-3 with a $T_g$ of −50° C. and | 45.2 (49.4) | 12.0 (13.2) | 10000 | 166 |
|  | PE-8 with a $T_g$ of 95° C. |  |  |  |  |
| CE-7 | 100:3 blend of CE-4 with a $T_g$ of −50° C. and | 20.6 (22.5) | 8.1 (8.9) | N/A | 147 |
|  | PE-9 with a $T_g$ of 95° C. |  |  |  |  |
| EX-1 | EHA/IBOA/AA/MMA/PE-1 (84/13/2/1/3) | 53.4 (58.4) | 24.6 (26.9) | 10000 | 10000 |
|  | where PE-1 has a $T_g$ of 95° C. |  |  |  |  |

Example 6 (EX-6)

A 30 gram sample of the polymeric latex of EX-1 (60% solid) was blended with 0.22 grams of PARAGUM 500 thickener. Ammonium was added into the mixture to adjust the pH to about 9.

A sample of the polymeric latex blend of EX-6 was coated with a hand-spread knife coater onto the cured release surface of the release liner of Preparatory Example 10 (PE-10) and then dried in a 70° C. oven for 20 minutes to give a "transfer tape" having a latex PSA layer with dry thickness of about 2 mil (0.002 inches, about 51 micrometers).

Example 7 (EX-7)

A 30 gram sample of the polymeric latex of EX-1 (60% solid) was blended with 0.3 grams of PARAGUM 500 thickener and 6.1 grams of SNOWTACK SE780G (55% solid) tackifier. The ratio of EX-1 dry polymer to dry tackifier was about 100:20. The pH of the resulting polymeric latex blend was adjusted to about 9.

A sample of the polymeric latex blend of EX-7 was coated with hand-spread knife coater onto the cured release surface of the release liner of Preparatory Example 10 (PE-10) and then dried in a 70° C. oven for 20 minutes to give a "transfer tape" having a latex PSA layer with dry thickness of about 2 mil (about 51 micrometers).

Release and Re-Adhesion Testing Preparation of EX-6 and EX-7 "Transfer Tapes"

Samples of "transfer tape" from Examples 6 and 7 were aged and/or conditioned under one of the three following conditions:

Condition 1: 23° C. at 50% relative humidity for 24 hours.

Condition 2: 23° C. at 50% relative humidity (RH) for 24 hours, followed by 32° C. at 90% RH for 48 hours, and then equilibrating for 1 hour at 23° C. at 50% relative humidity.

Condition 3: 23° C. at 50% relative humidity for 24 hours, followed by heating in a 70° C. oven (humidity not controlled) for 48 hours, and then equilibrating for 1 hour at 23° C. at 50% relative humidity.

After the conditioning steps, a 25 micrometer (1.0 mil) primed PET film was laminated to the conditioned latex PSA layer to form laminated test samples. The primed PET film was prepared by application of a sol-gel primer as described in Japanese Patent No. J02200476-A and as further described in U.S. Pat. No. 5,204,219 (Van Ooij et al.), European Patent No. 0301827 B 1 (Woo et al.), and European Patent No. 0372756 (Strobel et al).

The peel adhesion value was a measure of the force required to pull the PET-backed adhesive tape from the short-wave UV-cured liner at an angle of 180 degrees at a rate of 30.5 cm/min (12 inches/minute). The IMASS MODEL SP2000 PEEL TESTER (IMASS Corp. (Accord, Mass., USA)) was used to record the peel adhesion value, summarized as "Release" value in Table 6.

To determine the re-adhesion value, PET-backed tape samples were peeled from the short-wave UV-cured liner using the Release testing method (Test Method 11), and the resulting PET-backed tape was then applied to the surface of a clean stainless steel panel. The PET-backed tape sample was rolled down against the panel by means of two passes with a 2 kg rubber roller at 61 cm/min (24 inches/min). The re-adhesion value was a measure of the force required to pull the PET-backed tape from the steel surface at an angle of 180 degrees at a rate of 30.5 cm/min (12 inches/minute). The IMASS MODEL SP2000 PEEL TESTER was used to record the peel force, summarized as "Re-adhesion" value in Table 6.

TABLE 6

Performance of transfer tape samples EX-6 and EX-7

| "Transfer Tape" Sample | Condition 1 | | Condition 2 | | Condition 3 | |
|---|---|---|---|---|---|---|
| | Release, g/in (g/cm) | Re-adhesion, oz/in (N/dm) | Release, g/in (g/cm) | Re-adhesion, oz/in (N/dm) | Release, g/in (g/cm) | Re-adhesion, oz/in (N/dm) |
| EX-6 | 11.3 (4.4) | 31.4 (34.4) | 10.5 (4.1) | 30.2 (33.1) | 19.4 (7.6) | 28.8 (31.5) |
| EX-7 | 11.1 (4.4) | 35.1 (38.4) | 10.2 (4.0) | 32.7 (35.8) | 16.4 (6.5) | 35.1 (38.4) |

Example 8 (EX-8)

The latex of Example 1 (EX-1) was coated with hand-spread knife coater on 1 mil (0.001 inches, 0.0025 cm) primed PET film, which was prepared by application of a sol-gel primer as described in Japanese Patent No. J02200476-A. The latex was dried in 70° C. oven for 20 minutes to give dry adhesive thickness of 2 mil (0.002 inches, 0.005 cm). After being conditioned in a constant temperature and humidity (23° C. and 50 percent relative humidity) room for 24 hours, the PSA was evaluated using the fabric adhesion test (Test Method 11), with the result shown in Table 7.

Example 9 (EX-9)

The latex of Example 2 (EX-2) was coated with hand-spread knife coater on 1 mil (0.001 inches, 0.0025 cm) primed PET film, which was prepared by application of a sol-gel primer as described in Japanese Patent No. J02200476-A. The latex was dried in 70° C. oven for 20 minutes to give dry adhesive thickness of 2 mil (0.002 inches, 0.005 cm). After being conditioned in a constant temperature and humidity (23° C. and 50 percent relative humidity) room for 24 hours, the PSA was evaluated using the fabric adhesion test (Test Method 11), with the result shown in Table 7.

TABLE 7

Performance of fabric bonding samples EX-8 and EX-9

| "Fabric bonding" Sample | Fabric bonding peel adhesion, oz/in (N/dm) |
|---|---|
| EX-8 | 10.6 (11.6) |
| EX-9 | 10.9 (11.9) |

We claim:
1. An emulsion composition comprising:
a) water;
b) a polymerizable surfactant having an unsaturated group that can undergo free radical polymerization;
c) a first monomer composition comprising
  1) an alkyl (meth)acrylate having a linear or branched alkyl group with at least six carbon atoms; and
d) a second (meth)acrylate polymer in an amount of 0.5 to 15 wt % based on a total weight of monomers in the first monomer composition, wherein the second (meth)acrylate polymer has a $T_g$ greater than or equal to 50° C. and wherein the second (meth)acrylate polymer is formed from a second monomer composition comprising
  1) at least 50 weight percent of a cyclic alkyl (meth)acrylate based on a total weight of monomers in the second monomer composition, wherein the cyclic alkyl group has at least six carbon atoms;
wherein
  the emulsion has a first phase comprising the water and a second phase dispersed as droplets within the first phase; and
  the droplets comprise a mixture comprising
  1) the second (meth)acrylate polymer; and
  2) at least 90 weight percent of the first monomer composition, wherein the second (meth)acrylate polymer is not miscible with the first phase and is dissolved in the first monomer composition within the droplets.

2. The emulsion composition of claim 1, wherein the first monomer composition further comprises a cyclic alkyl (meth)acrylate, a polar monomer, or both.

3. The emulsion composition of claim 1, wherein the first monomer composition comprises 60 to 98 weight percent of the alkyl (meth)acrylate having a linear or branched alkyl group with at least six carbon atoms, 1 to 30 weight percent of a cyclic alkyl (meth)acrylate, and 1 to 10 weight percent of the polar monomer.

4. The emulsion composition of claim 1, wherein the second monomer composition comprises 50 to 100 weight percent of a cyclic alkyl (meth)acrylate and 0 to 50 weight percent of an optional monomer that is a polar monomer, an alkyl (meth)acrylate having a linear or branched alkyl group, and a vinyl monomer that does not have a (meth)acryloyl group, (meth)acrylamide, (meth)acrylonitrile, an N-alkyl (meth)acrylamide, N,N-dialkyl (meth)acrylamide, or a mixture thereof.

5. The emulsion composition of claim 1, wherein the second monomer composition comprises 90 to 100 weight percent of the cyclic alkyl (meth)acrylate and 0 to 10 percent polar monomer.

6. The emulsion composition of claim 1, wherein the first monomer composition is different than the second monomer composition.

7. The emulsion composition of claim 1, wherein the second (meth)acrylate polymer has a weight average molecular weight in a range of 3,000 to 150,000 grams/mole.

8. The emulsion composition of claim 1, wherein the emulsion does not contain a tackifier.

9. A latex composition comprising a polymerized product of the emulsion composition of claim 1, wherein the latex composition comprises polymeric latex particles.

10. The latex composition of claim 9, wherein the polymeric latex particles have a single glass transition temperature as determined using a Differential Scanning Calorimeter.

11. The latex composition of claim 9, wherein the second (meth)acrylate polymer and a polymerized product of the first monomer composition are together in the same polymeric particles.

12. The latex composition of claim 9, further comprising a tackifier that is water dispersible.

13. A pressure-sensitive adhesive comprising a dried product of the latex composition of claim 9.

14. An article comprising:
   a) a substrate; and
   b) a first pressure-sensitive adhesive layer positioned adjacent to a first major surface of the substrate, wherein the first pressure-sensitive adhesive layer comprises the pressure-sensitive adhesive of claim 13.

15. A method of forming a pressure-sensitive adhesive, the method comprising
   a) forming an emulsion composition of claim 1;
   b) polymerizing the emulsion composition to form a latex composition comprising polymeric latex particles; and
   c) drying the latex composition to form the pressure-sensitive adhesive.

\* \* \* \* \*

UNITED STATES PATENT AND TRADEMARK OFFICE
CERTIFICATE OF CORRECTION

PATENT NO. : 10,081,745 B1
APPLICATION NO. : 15/538981
DATED : September 25, 2018
INVENTOR(S) : Lili Qie It is certified that error appears in the above-identified patent and that said Letters Patent is hereby corrected as shown below:

In the Specification

Column 6
Line 20, delete "MAXENUL" and insert -- MAXEMUL --, therefor.

Column 8
Lines 13-14, delete "-butylcylcohexyl" and insert -- -butylcyclohexyl --, therefor.

Column 10
Line 59, delete "-butylcylcohexyl" and insert -- -butylcyclohexyl --, therefor.
Line 66, delete "-butylcylcohexyl" and insert -- -butylcyclohexyl --, therefor.

Column 12
Line 12, delete "pyrollidone" and insert -- pyrrolidone --, therefor.

Column 13
Line 39, delete "photoinitator" and insert -- photoinitiator --, therefor.

Column 16
Line 66, delete "trimehtylolpropane" and insert -- trimethylolpropane --, therefor.

Column 20
Line 33, delete "pentaertythritol" and insert -- pentaerythritol --, therefor.

Column 28
Line 39 (approx.), delete "100λ" and insert -- 100X --, therefor.

Column 32
Line 19 (approx.), delete "0.6 ppph" and insert -- 0.6 pph --, therefor.

Signed and Sealed this
Thirteenth Day of November, 2018

Andrei Iancu
*Director of the United States Patent and Trademark Office*

Columns 35-36
Line 39 (approx.), delete "62" and insert -- 60 --, therefor.
Line 43 (approx.), delete "60" and insert -- 62 --, therefor.